US012596842B2

(12) United States Patent (10) Patent No.: US 12,596,842 B2

Ninglekhu et al. (45) **Date of Patent: \*Apr. 7, 2026**

(54) DATA ANONYMIZATION FOR SERVICE SUBSCRIBER'S PRIVACY

(71) Applicant: InterDigital Patent Holdings, Inc., Wilmington, DE (US)

(72) Inventors: Jiwan L. Ninglekhu, Royersford, PA (US); Michael F. Starsinic, Newtown, PA (US); Dale N. Seed, Allentown, PA (US); Catalina Mihaela Mladin, Hatboro, PA (US); William Robert Flynn, IV, Schwenksville, PA (US); Zhuo Chen, Claymont, DE (US); Quang Ly, North Wales, PA (US); Lu Liu, Conshohocken, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 73 days.

This patent is subject to a terminal disclaimer.

(21) Appl. No.: 18/588,321

(22) Filed: Feb. 27, 2024

(65) Prior Publication Data

US 2024/0273237 A1 Aug. 15, 2024

Related U.S. Application Data

(63) Continuation of application No. 17/059,830, filed as application No. PCT/US2019/035751 on Jun. 6, 2019, now Pat. No. 11,977,659.

(Continued)

(51) Int. Cl.
G06F 21/00 (2013.01)
G06F 21/62 (2013.01)
(Continued)

(52) U.S. Cl.
CPC ...... G06F 21/6254 (2013.01); G06F 21/6263 (2013.01); G16Y 10/75 (2020.01); H04W 12/02 (2013.01)

(58) Field of Classification Search
CPC . G06F 21/6254; G06F 21/6263; G16Y 10/75; H04W 12/02; H04W 4/70; H04L 63/0421; H04L 63/104
See application file for complete search history.

(56) References Cited

U.S. PATENT DOCUMENTS 11,665,188 B1 * 5/2023 Vashisht ................ H04L 63/10
726/23
2008/0141337 A1 6/2008 Yeung et al.
(Continued)

FOREIGN PATENT DOCUMENTS

CN 101091369 A 12/2007
CN 103596172 A 2/2014
(Continued)

OTHER PUBLICATIONS

Grusteser et al., "Anonymous Usage of Location-Based Services Through Spatial and Temporal Cloaking", MobiSys '03: Proceedings of the 1st international conference on Mobile systems, applications and services, Published: May 5, 2003.*
(Continued)

*Primary Examiner* — Morshed Mehedi
(74) *Attorney, Agent, or Firm* — Flaster Greenberg, P.C.

(57) ABSTRACT

An IoT/M2M service layer may be provided with the capability to protect user privacy. This functionality may allow the IoT/M2M service layer to anonymize user data, particularly when user data is shared with third party consumers. A privacy policy service may enable the IoT service layer system to generate anonymization (e.g., privacy) policies based on inputs such as legal obligations, subscriber privacy preferences, and an authorization level of the data (Continued)

consumer. Data anonymization policies may be output from the privacy policy service and may be sent to a data anonymization service, where raw data may be anonymized based on the one or more data anonymization policies. The output from the data anonymization service function may be a privatized (e.g., anonymized) version of data that may prevent the data consumer from discovering one or more identifying characteristics of a user.

19 Claims, 28 Drawing Sheets

Related U.S. Application Data

(60) Provisional application No. 62/681,709, filed on Jun. 7, 2018.

(51) Int. Cl.
*G16Y 10/75* (2020.01)
*H04W 12/02* (2009.01)

(56) References Cited

U.S. PATENT DOCUMENTS

| | | | | |
|---|---|---|---|---|
| 2011/0271352 | A1 | 11/2011 | Kalogridis et al. | |
| 2012/0084831 | A1* | 4/2012 | Hu | H04L 63/20 |
| | | | | 726/1 |
| 2012/0197488 | A1* | 8/2012 | Lee | H04L 67/12 |
| | | | | 701/1 |
| 2013/0017827 | A1* | 1/2013 | Muhanna | H04W 92/00 |
| | | | | 455/426.1 |
| 2013/0217332 | A1 | 8/2013 | Altman et al. | |
| 2013/0225122 | A1* | 8/2013 | Kahn | H04M 15/46 |
| | | | | 455/406 |
| 2013/0332600 | A1* | 12/2013 | Amaya Calvo | H04L 63/102 |
| | | | | 709/224 |
| 2014/0189001 | A1* | 7/2014 | Tyagi | H04W 4/70 |
| | | | | 709/204 |
| 2014/0325592 | A1* | 10/2014 | Unagami | G06Q 30/02 |
| | | | | 726/1 |
| 2015/0007249 | A1 | 1/2015 | Bezzi et al. | |
| 2015/0186674 | A1 | 7/2015 | Vyas et al. | |
| 2015/0373124 | A1* | 12/2015 | Bhalla | H04W 4/70 |
| | | | | 709/202 |
| 2016/0036628 | A1* | 2/2016 | Gupta | H04W 4/70 |
| | | | | 455/420 |
| 2016/0148017 | A1 | 5/2016 | Gossler et al. | |
| 2016/0323247 | A1* | 11/2016 | Stein | G06Q 20/02 |
| 2017/0063794 | A1* | 3/2017 | Jain | G06F 16/9024 |
| 2019/0182215 | A1 | 6/2019 | Dong et al. | |
| 2021/0256159 | A1 | 8/2021 | Ninglekhu et al. | |
| 2023/0120160 | A1* | 4/2023 | Oh | H04L 63/0815 |
| | | | | 726/5 |

FOREIGN PATENT DOCUMENTS

| | | | | | |
|---|---|---|---|---|---|
| CN | 105531980 | A | | 4/2016 | |
| CN | 105874768 | A | | 8/2016 | |
| CN | 106936765 | A | | 7/2017 | |
| CN | 116055050 | A | * | 5/2023 | H04L 9/0656 |
| EP | 3023896 | B1 | * | 2/2019 | G16H 10/60 |
| GB | 2473083 | A | | 3/2011 | |
| JP | 2017503278 | A | * | 1/2017 | H04W 12/02 |
| JP | 2017-174458 | A | | 9/2017 | |

OTHER PUBLICATIONS

Efthymiou et al., "Smart Grid Privacy via Anonymization of Smart Metering Data," 2010 First IEEE International Conference on Smart Grid Communications, Gaithersburg, MD, USA,, pp. 238-243 (Year: 2010).*

"OneM2M; Functional Architecture (oneM2M TS-0001 version 2.10.0 Release 2)", ETSI Technical Specification, European Telecommunications Standards Institute (ETSI), vol. oneM2M, No. V2.10.0 Oct. 5, 2016.

Granzow et al., "Security Solutions for oneM2M", TS-0003-SECURITY SOLUTIONS-V3_7 1.ZIP, ONEM2M vol. Work Programme, Work Progr, No. version= v3.7.1 Apr. 24, 2018, pp. 1-265.

Takabi et al., "Security and Privacy Challenges in Cloud Computing Environments", IEEE Security & Privacy, vol. 8 Issue: 6 (Year: 2010).

3rd Generation Partnership Project (3GPP), "System Architecture for the 5G System; Stage 2", Release 15, Technical Specification Group Services and System Aspects, 3GPP TS 23.501 V1.2.0, Jul. 2017, 166 pages.

NGMN, "Description of Network Slicing Concept", NGMN Alliance, Version 1.0, Jan. 13, 2016, 7 pages.

Open Connectivity Foundation, "OIC Core Specification V1.1.0, Part 1", 2016, 151 pages.

Open Mobile Alliance (oma), "Lightweight Machine to Machine Technical Specification" Approved version 1.0, Feb. 8, 2017, 138 pages.

ETSI, "Machine-to-Machine communications (M2M); Functional Architecture", ETSI TS 102 690 V2.0.13, May 2013, 328 pages.

\* cited by examiner

DATA ANONYMIZATION FOR SERVICE SUBSCRIBER'S PRIVACY

CROSS-REFERENCE TO RELATED APPLICATIONS

This application is a continuation of U.S. patent application Ser. No. 17/059,830 filed Nov. 30, 2020 which is the National Stage of International Patent Application No. PCT/US2019/035751, filed Jun. 6, 2019, which claims the benefit of U.S. Provisional Patent Application No. 62/681,709, filed Jun. 7, 2018, the disclosures of which are incorporated herein by reference in their entireties.

BACKGROUND

An M2M/IoT Service Layer (SL) is a technology specifically targeted towards providing value-added services for M2M/IoT devices, IoT applications, and IoT data. Recently, several industry standard bodies (e.g., oneM2M, ETSI, OCF, and LWM2M) have been developing M2M/IoT SLs to address the challenges associated with the integration of M2M/IoT devices, applications and data into deployments with Internet/Web, cellular, enterprise, and home networks.

SUMMARY

Methods and systems are disclosed for providing an IoT/M2M service layer with the capability to protect user privacy. This functionality may allow the IoT/M2M service layer to anonymize user data, particularly when user data is shared with third party consumers. A privacy policy service may enable the IoT service layer system to generate anonymization (e.g., privacy) policies based on inputs such as legal obligations, subscriber privacy preferences, and an authorization level of the data consumer. Data anonymization policies may be output from the privacy policy service and may be sent to a data anonymization service, where raw data may be anonymized based on the one or more data anonymization policies. The output from the data anonymization service function may be a privatized (e.g., anonymized) version of data that may prevent the data consumer from discovering one or more identifying characteristics of a user.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF ILLUSTRATIVE EMBODIMENTS

An M2M/IoT SL can provide applications and devices access to a collection of M2M/IoT oriented capabilities. A few examples include security, charging, data management, device management, discovery, provisioning, and connectivity management. These capabilities may be made available to applications via APIs which make use of message formats, resource structures and resource representations supported by the M2M/IoT SL.

From a protocol stack perspective, SLs are typically situated above the Application Protocol Layer and provide value added services to applications they support. Hence, SLs are often categorized as 'middleware' services. Table shows an exemplary service layer situated between the Application Protocols and Applications.

TABLE 1

An Exemplary Protocol Stack Supporting a Service Layer

Application(s)
Service Layer (SL)
Application Protocols (e.g. HTTP, COAP, MQTT)
Transport Protocols (e.g. TCP, UDP)
Network Protocols (e.g. IPv4/IPv6)
Access Network Protocols (e.g. Ethernet, Cellular, Wi-Fi)

Figure 1:
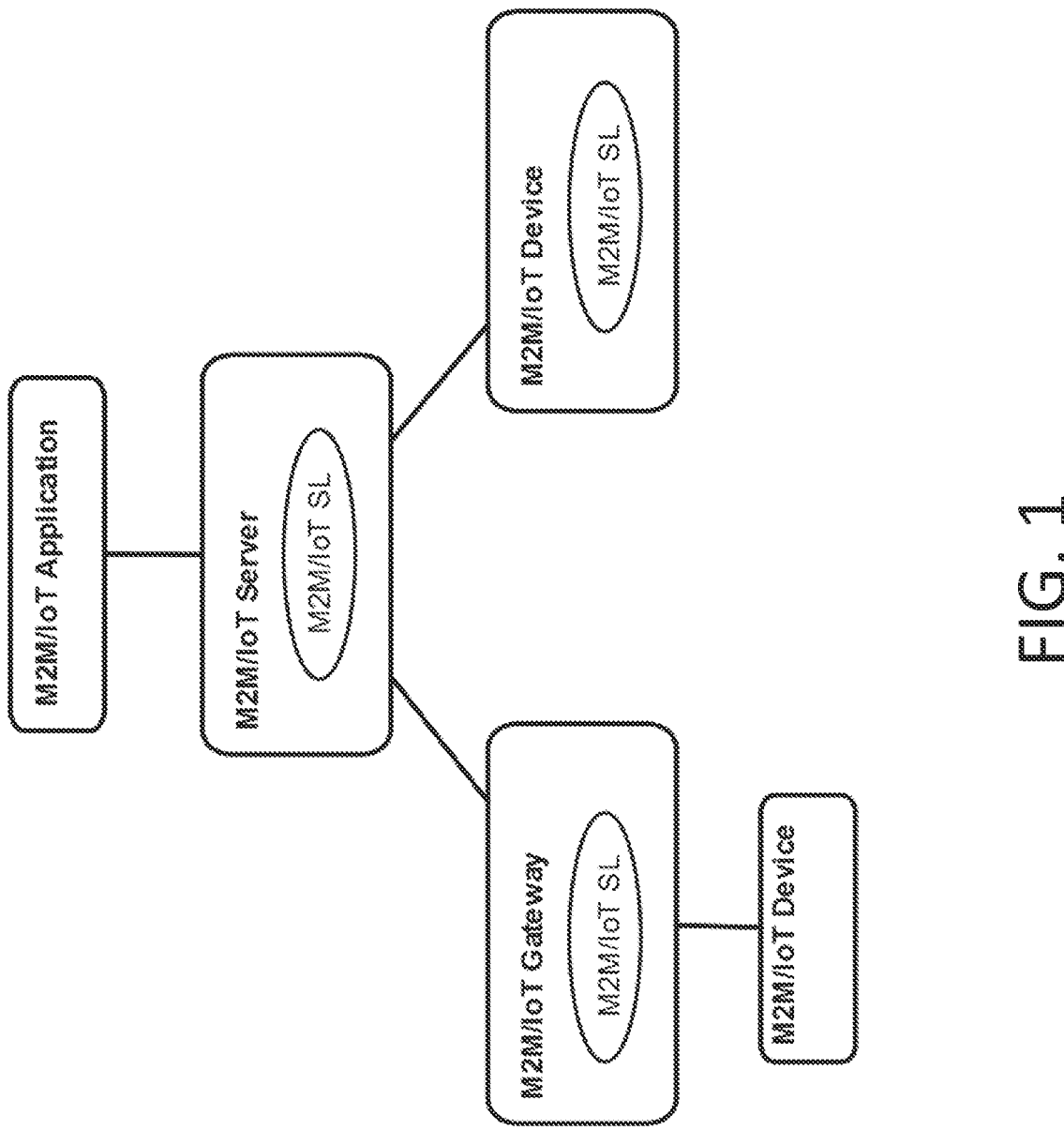
FIG. 1 shows a block diagram of an example M2M/IoT service layer deployed on various types of nodes.

From a deployment perspective, an M2M/IoT SL can be deployed on various types of network nodes including servers, gateways and devices, as shown in FIG. 1.

Figure 2:
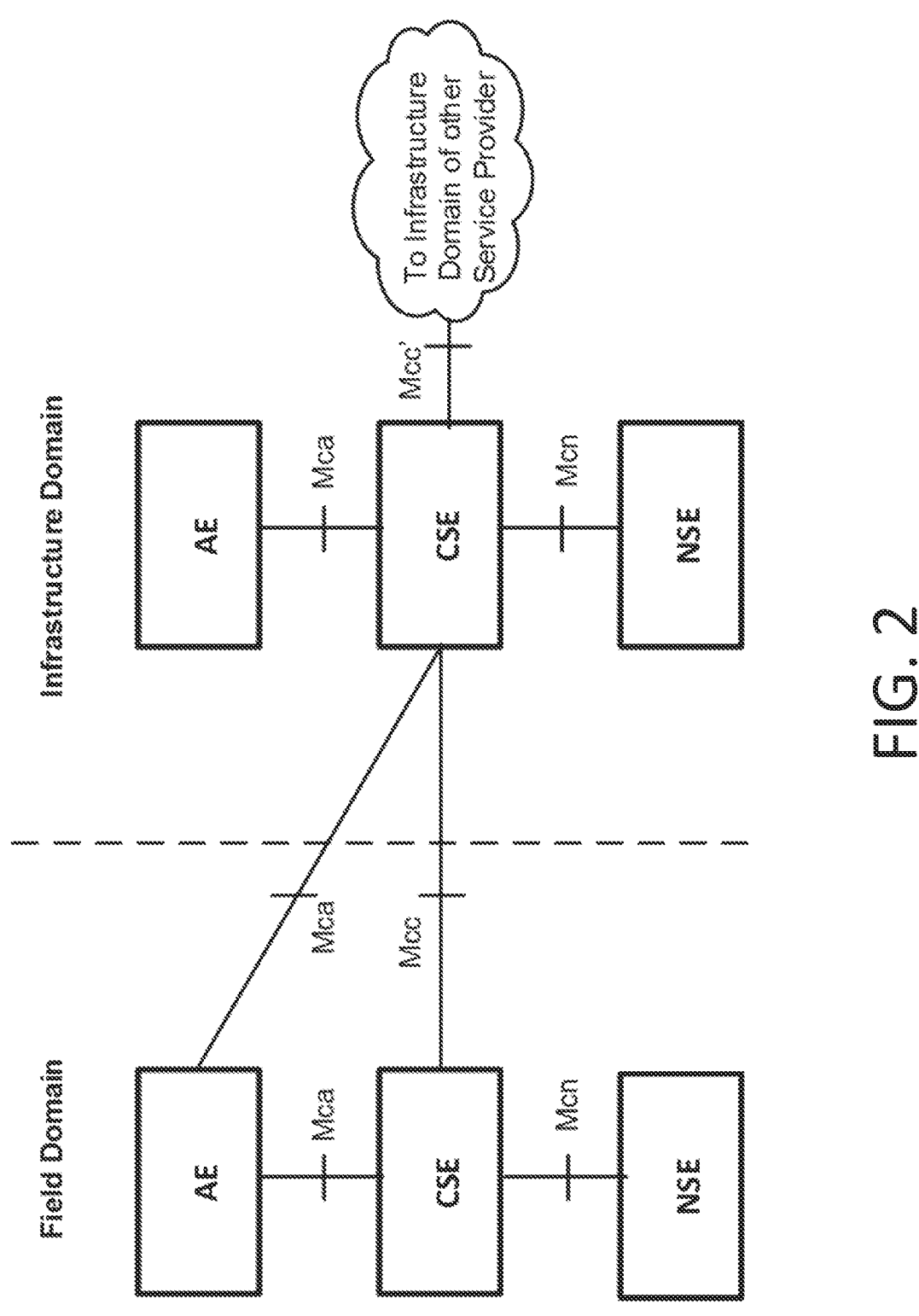
FIG. 2 shows a block diagram of an example oneM2M architecture.
Figure 3:
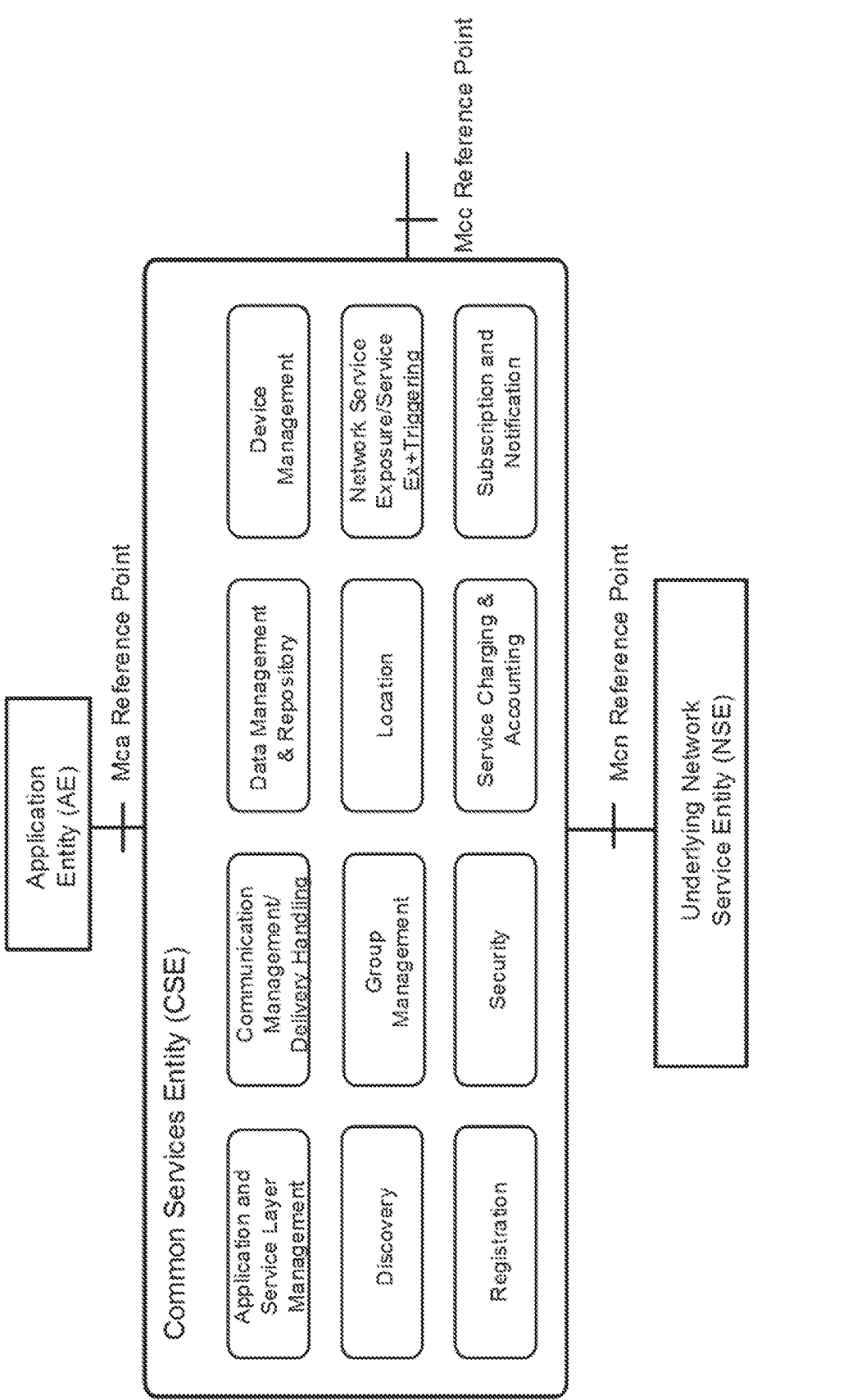
FIG. 3 shows a block diagram of an example oneM2M Common Service Function.

The oneM2M standard defines a M2M/IoT SL (see oneM2M-TS-0001, oneM2M Functional Architecture-V-2.10.1). The purpose of the SL is to provide "horizontal" services that can be utilized by different "vertical" M2M systems and applications, such as e-Health, fleet management, and smart homes. The architecture of the oneM2M SL, as shown in FIG. 2, defines a Common Service Entity (CSE) that supports four reference points. The Mca reference point interfaces with the Application Entity (AE). The Mcc reference point interfaces with another CSE within the same service provider domain and the Mcc' reference point interfaces with another CSE in a different service provider domain. The Men reference point interfaces with the underlying network service entity (NSE). An NSE provides underlying network services to the CSEs, such as device management, location services and device triggering. A CSE contains multiple logical functions called "Common Service Functions (CSFs)" such as "Discovery", "Data Management & Repository." FIG. 3 illustrates the CSFs supported by oneM2M.

The oneM2M architecture is a distributed architecture that supports deploying M2M/IoT services in a distributed manner across the following example types of Nodes:

Application Service Node (ASN): An ASN is a Node that contains one CSE and contains at least one Application Entity (AE). Example of physical mapping: an ASN could reside in an M2M Device;

Application Dedicated Node (ADN): An ADN is a Node that contains at least one AE and does not contain a CSE. Example of physical mapping: An Application Dedicated Node could reside in a constrained M2M Device;

Middle Node (MN): A MN is a Node that contains one CSE and contains zero or more AEs. Example of physical mapping: a MN could reside in an M2M Gateway;

Infrastructure Node (IN): An IN is a Node that contains one CSE and contains zero or more AEs. A CSE in an IN may contain CSE functions not applicable to other node types. Example of physical mapping: an IN could reside in an M2M Service Infrastructure; and Non-oneM2M Node (NoDN): A non-oneM2M Node is a Node that does not contain oneM2M Entities (neither AEs nor CSEs). Such Nodes represent devices attached to the oneM2M system for interworking purposes, including management.

Figure 4:
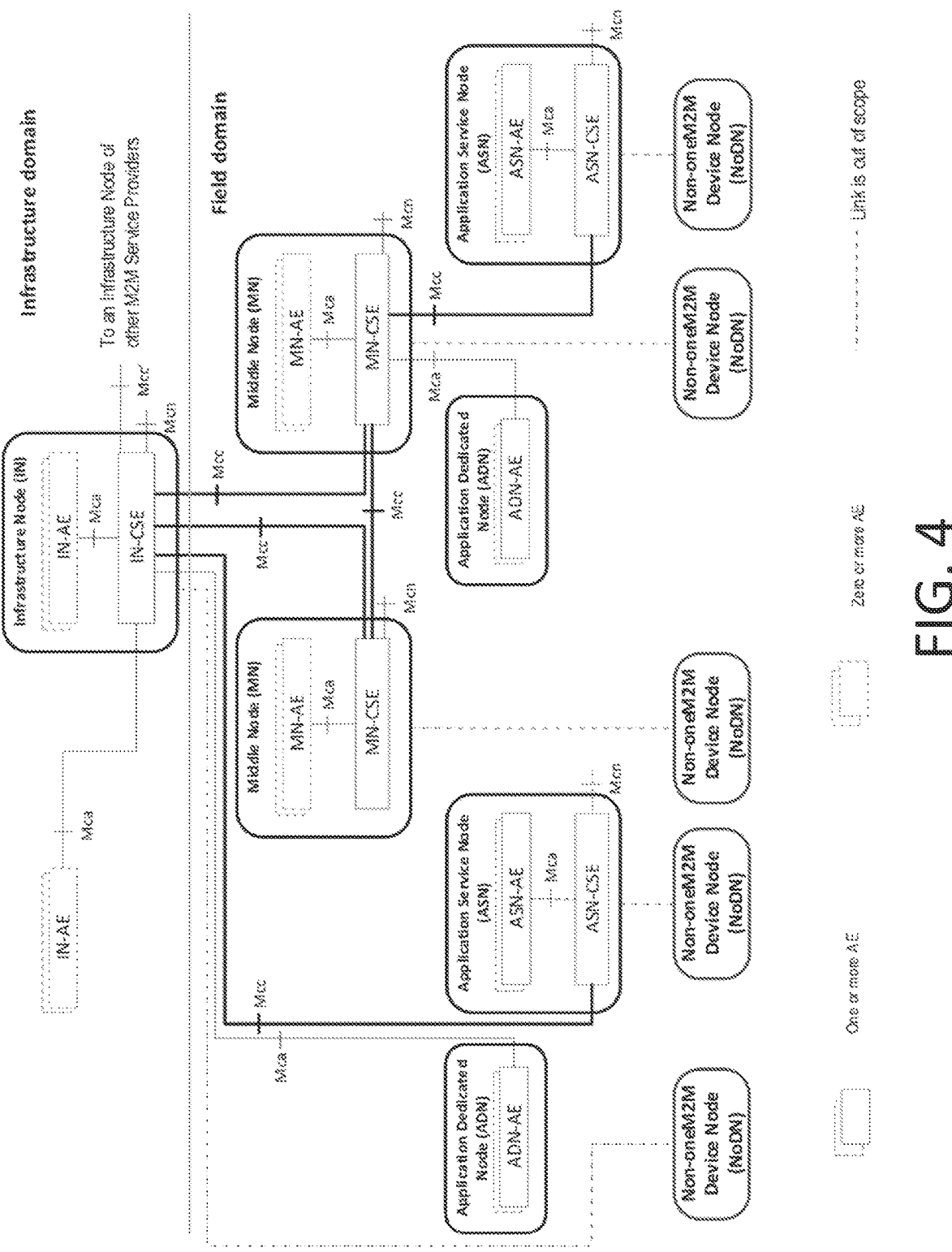
FIG. 4 shows a block diagram of example configurations supported by the oneM2M Architecture.

The possible configurations of inter-connecting the various entities supported within the oneM2M system are illustrated in FIG. 4.

The oneM2M/IoT system currently comprises a function for the control of privacy called a Privacy Protection Management (PPM) architecture. Expression for what is private depends on an individual's opinion, social norms and policies imposed by the governing body. The PPM function generates access control policies based on user's preferences, which allows only the authorized parties to have access to the user's personally identifiable information (PII). However, these policies do not offer access control to the granularity where user data could be anonymized (e.g., sanitized, aliased, abbreviated etc.). Disclosed herein are methods and systems which equip an M2M/IoT service layer with a functionality that can protect user privacy to such a level. The description of the Privacy Protection Architecture discussed below is taken from clause 11 of oneM2M-TS-0003, Security Solutions-V-3.0.6.

M2M Application Service Providers (ASPs) are defined as parties who have a subscription contract with the M2M Service Provider. An entity that subscribes to the services provided by an ASP via M2M/IoT Service Provider is referred to as M2M Service Subscriber.

Third party data consumers would like to have M2M Service Subscribers' data from a M2M Service Provider. Here, third party data consumers behave as ASPs. The Privacy Policy Manager (PPM) function within the oneM2M Security CSF is a personal data management framework based on the M2M Service Subscriber's privacy preferences that creates access control information from policies agreed on by an M2M Service Subscriber. The PPM protects M2M Service Subscriber's personal data from unauthorized parties and unauthorized collection. The PPM may be operated by the M2M Service Provider itself or another entity on behalf of the M2M Service Provider.

If the M2M Service Provider provides M2M Service Subscriber's personal data to any third party M2M Application Service Provider (ASP), the M2M Service Provider may need to get the M2M Service Subscriber's consent. An entity that data pertains to is known as a data subject. In other words, an M2M Service Subscriber is the data subject that supplies data. In the case when M2M Service Subscriber accepts a privacy policy which indicates provision to third party, the M2M Service Provider can provide the data subject's personal data to the third party. However, if the privacy policy did not include provision to third party, the Service Provider may need to update the privacy policy and get the M2M Service Subscriber's consent to it.

The PPM may manage privacy preferences and privacy policies.

A privacy preference is the M2M Service Subscriber's preference regarding the provision of his own personal data to third parties. An M2M Service Subscriber may create a M2M Service Subscriber's privacy preference and register it to the PPM. An example list of privacy attributes is described in Annex J of oneM2M-TS-0003.

A privacy policy describes a required personal data to provide a service to an M2M Service Subscriber by a M2M Service Provider. A M2M Service Provider may create a privacy policy and register it to the PPM.

The PPM maybe configured to perform one or more of the following functions:

(1) A sophisticated consent mechanism for matching a M2M Service Subscriber's privacy preference with the ASP's privacy policy. A privacy policy describes the required personal data to provide a service to a M2M Service Subscriber by a M2M Service Provider. When the M2M Service Subscriber subscribes to a service which is provided by a M2M Service Provider, the M2M Service Provider may need to get the M2M Service Subscriber's consent to the service's privacy policy. The PPM provides a friendly consent mechanism for the M2M Service Subscriber by comparing the privacy preference and the privacy policy.

(2) Functions of the Policy Decision Point (PDP) and Policy Retrieval Point (PRP) for Distributed Authorization, management of <AccessControlPolicy> resources, and Dynamic Authorization System Server (DASS) may be described as follows:

(a) PDP: When an Originator requests personal data from a Hosting CSE which acts as Policy Enforcement Point (PEP), the Hosting CSE may request access control decision data from the PPM which acts as a PDP. The PPM creates a <authorizationDecision> resource from access control information that is created from policies agreed to by the M2M Service Subscriber and responds with the <authorizationDecision> resource representation to the Hosting CSE. Details of PDP and <authorizationDecision> are described in TS-0003 clause 7.5.2 and TS-0001 clause 9.6.42, respectively.

(b) PRP: When an Originator requests personal data from a Hosting CSE which acts as PDP, the Hosting CSE may request access control policies from the PPM which acts as the PRP. The PPM creates a <authorizationPolicy> resource based on policies agreed to by M2M Service Subscribers and responds with the <authorizationPolicy> resource representation to the Hosting CSE. Details of the PRP and <authorizationPolicy> are described in TS-0003 clause 7.5.3 and TS-0001 clause 9.6.43, respectively.

(c) Management of <accessControlPolicy> resources hosted by CSEs: when an Originator requests personal data from a Hosting CSE, and this CSE uses a locally stored <accessControlPolicy> resource to derive the access control decision using the mechanism described in clause 7.1 (TS-0003), the PPM may act as an IN-AE which generates and deploys the required <accessControlPolicy> resources on the respective CSE and assigns appropriate accessControlPolicyID attributes to resources created by the M2M Service Subscriber.

(d) Dynamic Authorization System:

(i) Direct Dynamic Authorization: when an Originator requests personal data from a Hosting CSE, the Hosting CSE requests <dynamicACPInfo> or <token> resources from the PPM. The PPM creates <dynamicACPInfo> or <token> resources based on policies agreed to by M2M Service Subscribers and responds with a <dynamicACPInfo> or <token> resource representations to the Hosting CSE. Details of Direct Dynamic Authorization is described in TS-0003 clause 7.3.2.2. Details of <dynamicACPInfo> and <token> resources are described in TS-0001 clause 9.6.40 and clause 9.6.39, respectively.

(ii) Indirect Dynamic Authorization: before an Originator requests personal data from a Hosting CSE, the Originator requests a <token> resource or a tokenID from the PPM. The PPM creates a <token> resource based on policies agreed to by M2M Service Subscribers and responds with a <token> resource representation or a tokenID to the Originator. Then, the Originator requests personal data from the Hosting CSE with a <token> resource or tokenID. Details of Indirect Dynamic Authorization is described in TS-0003 clause 7.3.2.3.

(3) Traceability of personal data usage: The PPM may store the access log that records which Originator accessed which kind of collected data. This function is for further study in oneM2M, but this function can be implemented using components that are defined in oneM2M.

The PPM may be configured to manage an M2M Service Subscriber's preference and a service's privacy policy of an M2M Application Service Provider. Basically, an M2M Application Service Provider has one PPM in the infrastructure domain and manages the status of a M2M Service Subscriber's consent in the PPM. There are four procedures in the use of the PPM, which may have the following relationships:

An M2M Service Subscriber subscribes to services provided by the M2M Service Provider;

The M2M Service Subscriber subscribes to a service offered by an ASP;

An AE (IN-AE or field domain AE) requests personal data that is stored in a Hosting CSE; and The M2M Service Subscriber checks the access log of his/her own personal data and requests the deletion of the collected personal data from the Hosting CSE.

A number of involved entities that may use the procedures are described below:

(1) An M2M Service Subscriber: An M2M Service Subscriber can make use of M2M services by subscribing to a service of an ASP which provides functions that control access to information handled by the M2M Service Provider. Personal data is information that can be used on its own, or with other information to identify an individual to form Personally Identifiable Information (PII).

(2) An ADN-AE, ASN-AE: An ADN-AE or ASN-AE produces various kinds of data, such as sensor data. An ADN-AE or ASN-AE may also request data from resource hosting CSEs.

(3) Hosting CSE: if the Hosting CSE uses the PPM as PDP, the Hosting CSE may act as a Policy Enforcement Point (PEP). If the Hosting CSE uses the PPM as a PRP, the Hosting CSE may act as a PDP. If the Hosting CSE uses the PPM as DAS, the Hosting CSE may configure <dynamicAuthorizationConsultation> resources linked to the requested resource.

(4) Application Service Provider: an Application Service Provider provides services to an M2M Service Subscriber who joins the M2M Service Provider.

(5) M2M Service Provider: an M2M portal provides an M2M Service Subscriber Interface through which services provided by an M2M Platform may be managed.

(6) PPM: the PPM may include functionality for an automated procedure (not defined by oneM2M) to create access control policies and to deploy these on CSEs according to the policies and the preferences agreed by a M2M Service Subscriber. If the PPM acts as PDP or PRP, it may require CSE functionality. If the PPM acts as Dynamic Authorization Service Server, the PPM may require AE functionality. The PPM may provide an M2M Service Subscriber Interface via a PPM portal. A M2M Service Subscriber may access the PPM portal to configure the M2M Service Subscriber's privacy preference. The PPM portal is out of scope of oneM2M.

Figure 5:
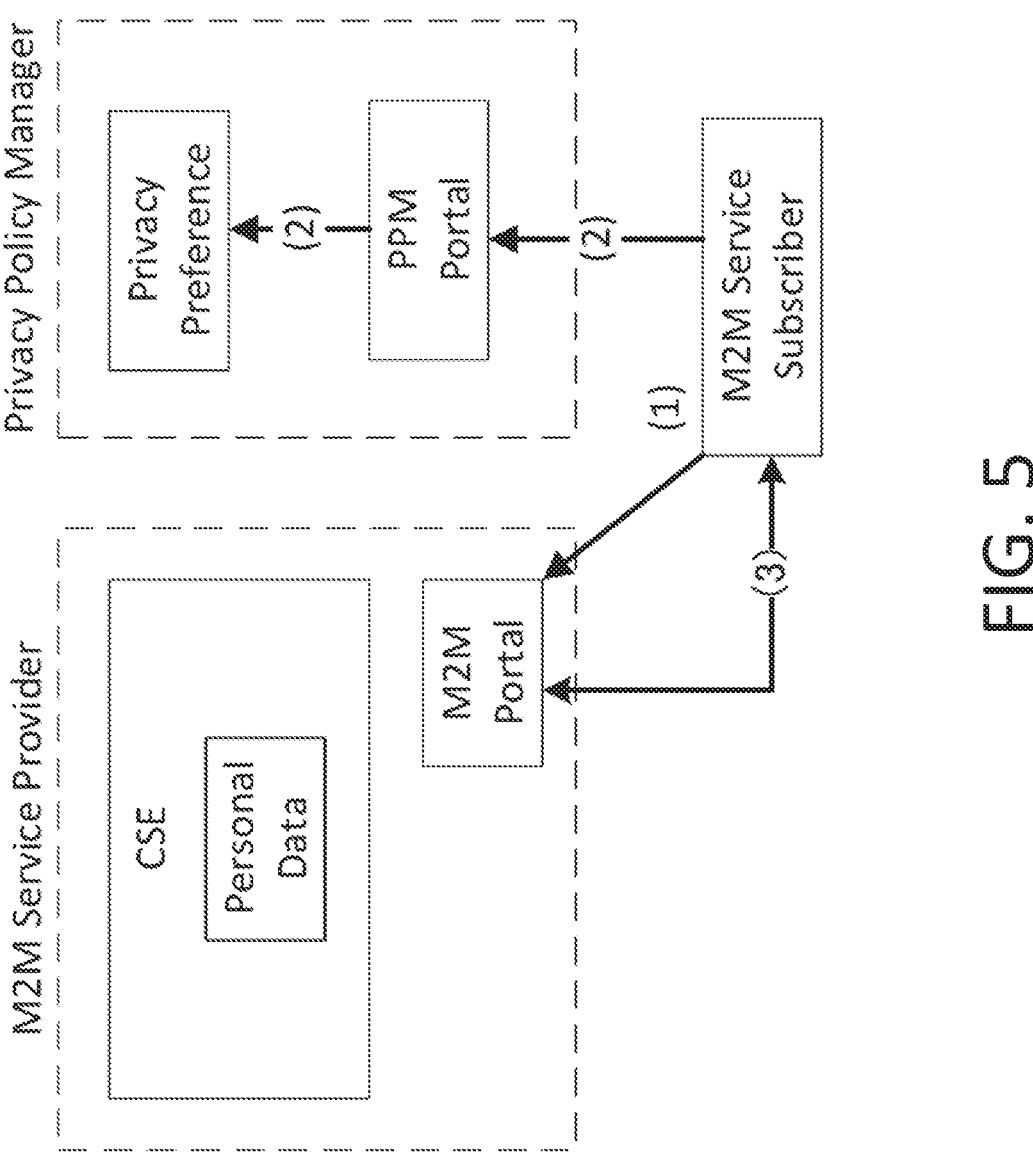
FIG. 5 shows a flow chart of an example method for an M2M service subscriber subscribing to an M2M service provider.

An example Management Flow in the PPM Architecture is described herein. When a M2M Service Subscriber subscribes to an M2M Service Provider, the M2M Service Subscriber configures privacy preferences using the PPM. A privacy preference/policy explains what data is intended to be used by ASPs and allowed by consent to be shared with other service subscribers. An example process is depicted in FIG. 5.

At step 1, an M2M Service Subscriber accesses the M2M portal of a M2M Service Provider. This process typically uses Web access protocols such as HTTP, HTTPS and so on.

At step 2, the M2M Service Subscriber configures a privacy preference and registers it on the PPM portal. The M2M Service Subscriber accesses the PPM portal, or the M2M portal redirects the M2M Service Provider to the PPM portal. This process may use Web access protocols.

At step 3, the M2M Service Provider collects and stores data from the M2M Service Subscriber.

Figure 6:
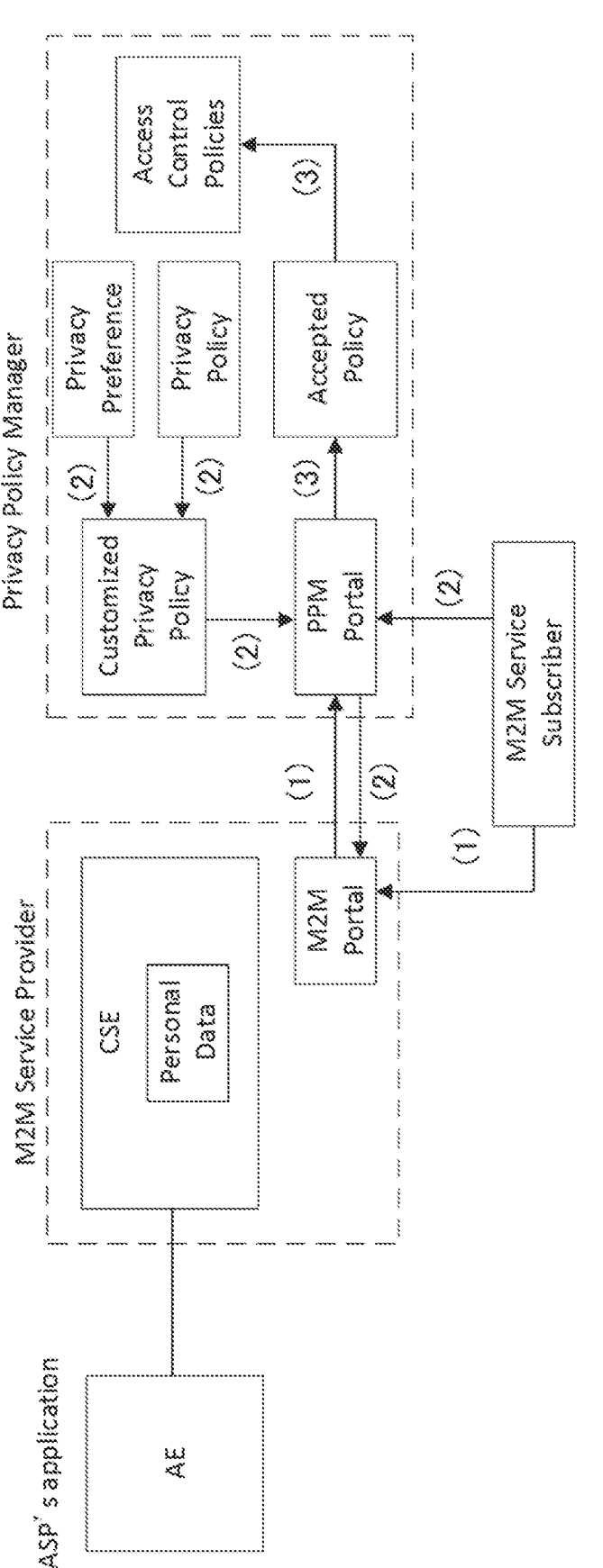
FIG. 6 shows a flow chart of an example method for an M2M service subscriber subscribing to an ASP service.

The M2M Service Subscriber can subscribe to various kinds of services provided by ASPs through the M2M Service Provider. Service lists are registered on an M2M portal and the M2M Service Subscriber can select services to subscribe to. When the M2M Service Subscriber subscribes to a service, the M2M Service Subscriber may need to accept the ASP's privacy policy. In order for the M2M Service Subscriber to easily understand this policy, the PPM may create the customized privacy policy based on the privacy policy provided by the ASP and the M2M Service Subscriber's privacy preference. Therefore, the M2M Service Subscriber can control personal data, and agreement implies understanding of the privacy policy. FIG. 6 shows an example overview of this process.

At step 1, the M2M Service Subscriber accesses the M2M portal and selects an ASP's service to subscribe. The M2M portal redirects to the PPM portal to get the M2M Service Subscriber's consent. This process typically uses Web access protocols such as HTTP, HTTPS and so on.

At step 2, the M2M Service Subscriber may need to accept a privacy policy to subscribe to the ASP's service. The PPM may create the customized privacy policy for each M2M Service Subscriber based on the M2M Service Subscriber's privacy preference and service's privacy policy. It is easy for the M2M Service Subscriber to confirm differences between the privacy preference and the privacy policy and to understand what kind of personal data are collected by the ASP. After the M2M Service Subscriber accepts the privacy policy, the M2M Service Subscriber can subscribe to the ASP's service.

At step 3, the PPM may create or update access control policies using the privacy policy that the M2M Service Subscriber accepted.

Four different implantation options were presented in TS-0003-V 3.6.0. These include:

(1) The PPM works as PDP;
(2) The PPM works as PRP;
(3) The PPM works as Dynamic Authorization System Server (DASS) using one of:
(a) Direct Dynamic Authorization; and
(b) Indirect Dynamic Authorization, PPM is a data management framework designed on the basis that allows users to express their privacy preferences. Users' personally identifiable information (PII) is guarded against the adversaries and unauthorized parties using access control policies designed with users' privacy preferences. PPM can be operated by M2M service provider or another trusted stakeholder. The service provider or the trusted stakeholder may need a user's acceptance to share that user's PII to share it with a third party. The privacy policy may include the provision about the third party.

The end user who subscribes to the service provided by the service provider becomes a data subject. The data subject has its privacy preference template. When it intends to subscribe to services, it downloads the privacy preference template from the PPM Portal and compares it to find if it aligns with the privacy preference template it has. The end user selects and deselects attributes to state their privacy preference which are then registered on the PPM using the same portal.

In oneM2M, a PPM can serve two functionalities. Firstly, it can behave as a policy decision point (PDP) wherein when an application requests personal data from IN-CSE, the PPM replies with access decisions based on user's privacy preferences. Secondly, it can behave as a policy retrieval point (PRP). When an application requests personal data from the IN-CSE, wherein the PDP can request for access control policies from the PPM, the PPM replies with access control policies that are based on user's privacy preferences.

In the oneM2M Service Layer, the Registration (REG) CSF processes a request from an AE or another CSE to register with a Registrar CSE in order to allow the registered entities to use the services offered by the Registrar CSE.

Registration is a process by which an entity creates an <AE> resource if the entity registering is an AE or creates a <remoteCSE> resource if a CSE is registering. If there is a registration update, these resources may be updated.

Registration is the process of delivering AE or CSE information to another CSE in order to use M2M Services. An AE on an ASN, an MN or an IN performs registration locally with a corresponding CSE in order to use M2M services offered by that CSE. An AE on an ADN performs registration with the CSE on an MN or an IN in order to use M2M services offered by that CSE. An IN-AE performs registration with the corresponding CSE on an IN in order to use M2M services offered by that IN CSE. An AE can have interactions with its Registrar CSE (when it is the target CSE) without the need to have the Registrar CSE register with other CSEs. The CSE on an ASN performs registration with the CSE in the MN in order to be able to use M2M Services offered by the CSE in the MN. As a result of successful ASN-CSE registration with the MN-CSE, the CSEs on the ASN and the MN establish a relationship allowing them to exchange information.

The CSE in an MN performs registration with the CSE of another MN in order to be able to use M2M Services offered by the CSE in the other MN. As a result of successful MN-CSE registration with the other MN-CSE, the CSEs on the MNs establish a relationship allowing them to exchange information. The CSE on an ASN or on an MN perform registration with the CSE in the IN in order to be able to use M2M Services offered by the CSE in the IN. As a result of successful ASN/MN registration with the IN-CSE, the CSEs on ASN/MN and IN establish a relationship allowing them to exchange information.

The oneM2M platform assumes IoT devices are smart devices. Hence, virtual representation of IoT devices can be created in the oneM2M Service Provider platform as part of the registration process.

oneM2M doesn't have a notion of users or ownership of these IoT devices. However, in real life scenarios, a user or an organization may need to take responsibility and have control over these devices. There may also be scenarios where devices are owned by a user or are properties of an organization, but are leased to another user or organization. In those scenarios, a notion of a user or subscriber profile may be introduced in the service layer. A user profile, as disclosed herein, may contain account information about the user. For instance, it can contain user's name, user's ID, street address, and devices owned.

Figure 7:
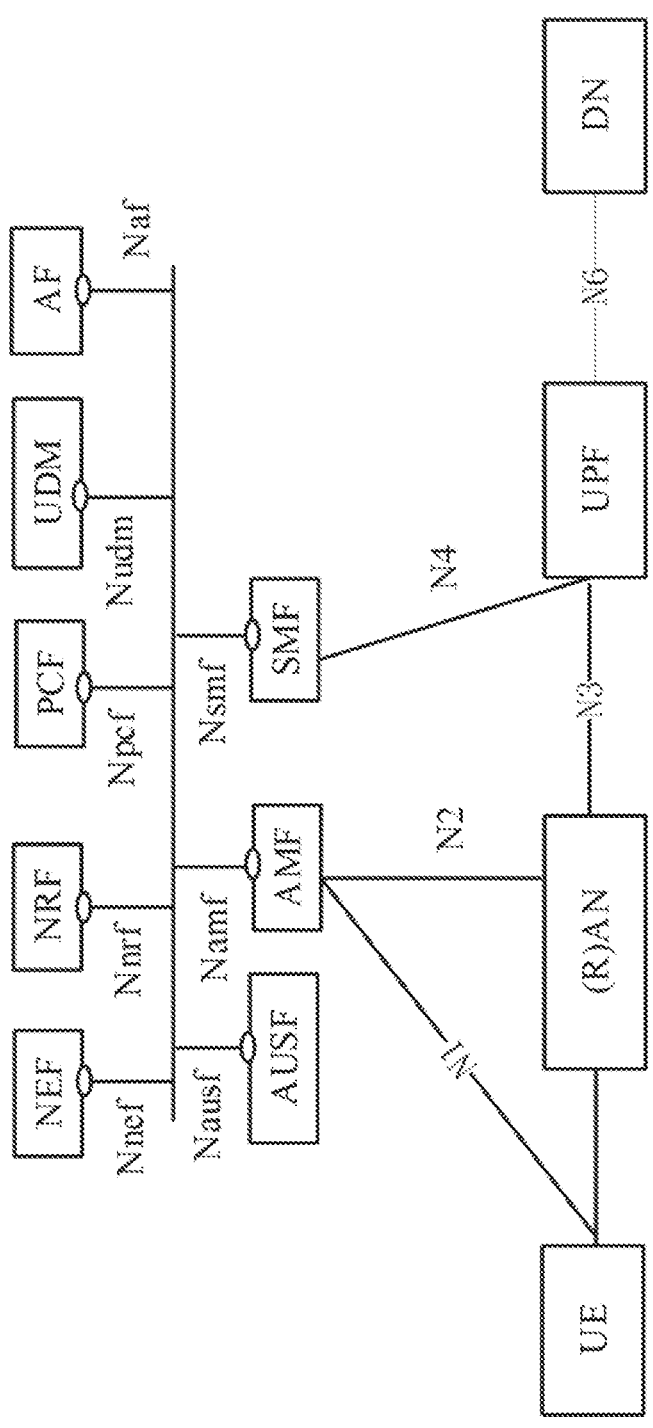
FIG. 7 shows a block diagram of an example 5G system service-based architecture.
Figure 8:
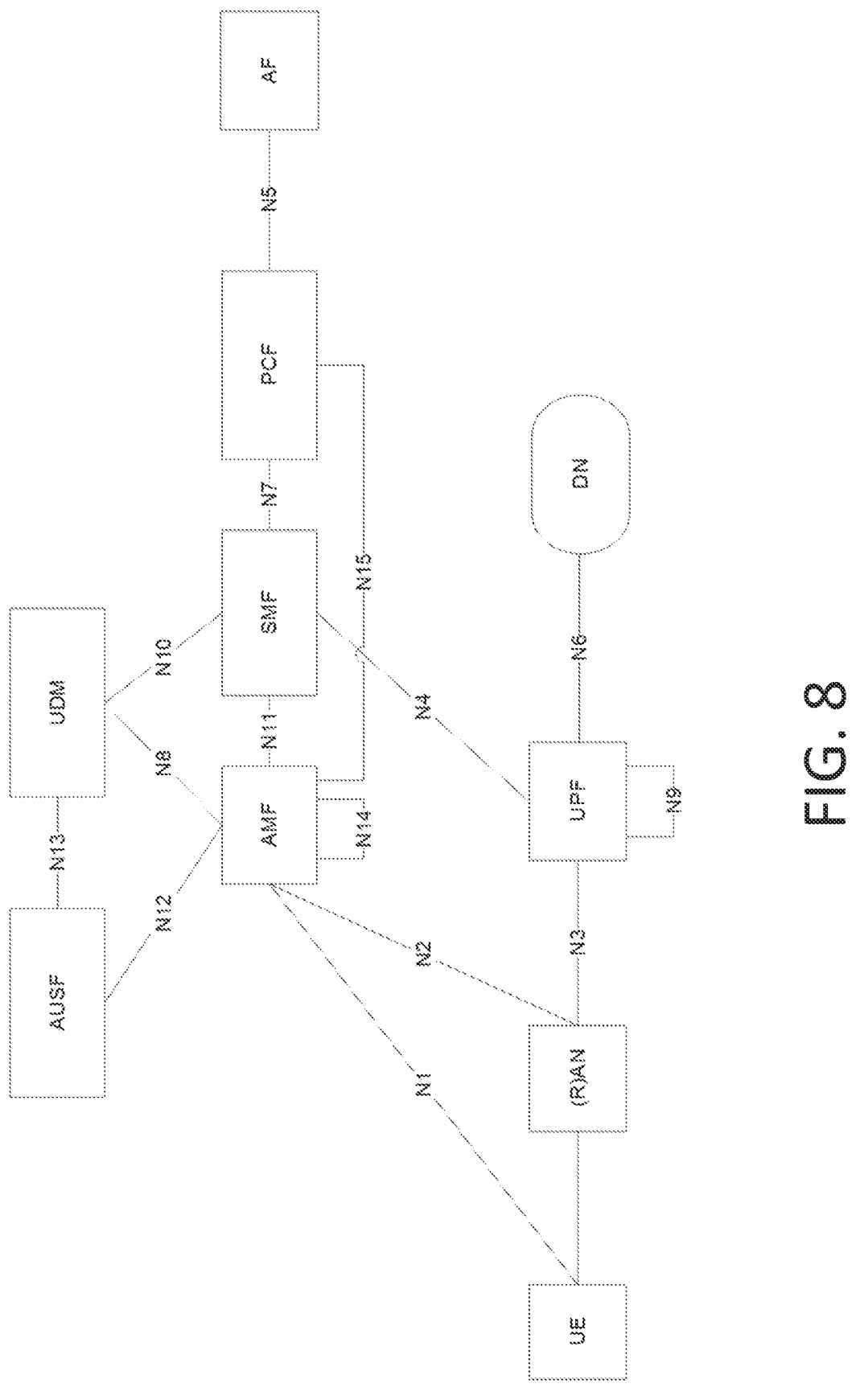
FIG. 8 shows a block diagram of an example non-roaming 5G system architecture.

The 5G Mobile Core Network Architecture is defined in "3GPP TS 23.501, System Architecture for the 5G System; Stage 2, v 1.2.0, Release 15." FIG. 7 shows the non-roaming reference architecture with service-based interfaces within the Control Plane. FIG. 8 depicts the 5G System architecture in the non-roaming case, using the reference point representation showing how various network functions interact with each other.

It is worth noting that the mobility management and session management functions are separated. A single N1 NAS connection is used for both Registration Management and Connection Management (RM/CM) and for SM-related messages and procedures for a UE. The single N1 termination point is located in AMF. The AMF forwards SM related NAS information to the SMF. AMF handles the Registration Management and Connection Management part of NAS signaling exchanged with the UE. SMF handles the Session management part of NAS signaling exchanged with the UE.

As described in 3GPP TS 23.501, the 5GC includes a NWDA network function that collects analytics information from third party application servers and other NF's. The NWDA also provides analytics information to other NF's and third party application servers, third party application servers and NF's can use analytic information to optimize network configuration, data paths, communication policies, etc.

Figure 9:
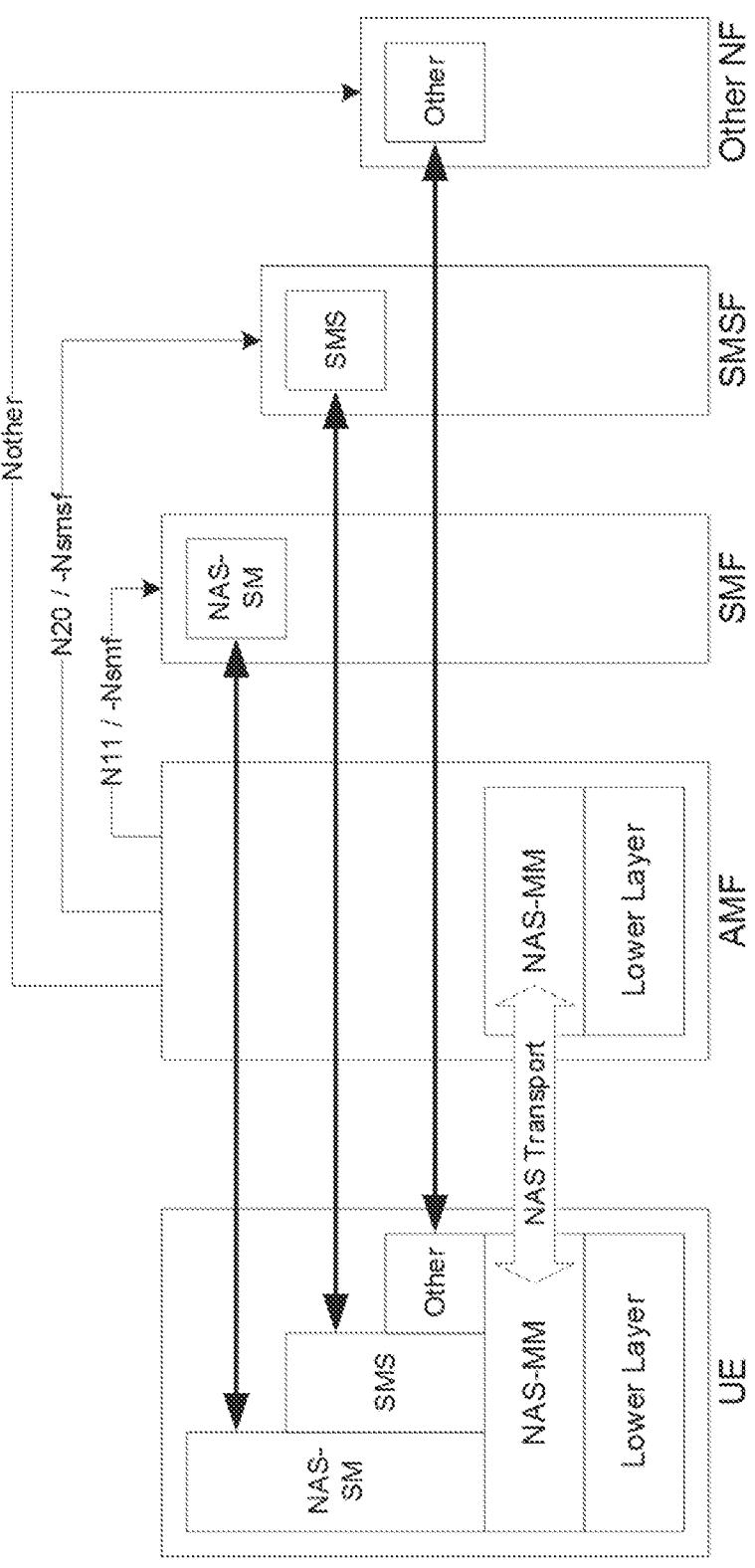
FIG. 9 shows a flow chart of an example method of NAS transport for SM, SMS and other services.

A single N1 NAS connection is used for each access to which the UE is connected. The single N1 termination point is located in AMF. The single N1 NAS connection is used for both Registration Management and Connection Management (RM/CM) and for SM-related messages and procedures for a UE. The NAS protocol over N1 consists of a NAS-MM and a NAS-SM component. FIG. 9 shows the general protocol stack between the UE and the 5G core network over the N1 interface (e.g., between UE and AMF).

Network Slicing is a mechanism that could be used by mobile network operators to support multiple 'virtual' networks behind the air interface across the fixed part of the mobile operator's network, both backhaul and core network (see NGMN Alliance. "Description of Network Slicing Concept"). This involves 'slicing' the network into multiple virtual networks to support different RANs or different service types running across a single RAN. Network slicing enables the operator to create networks customized to provide optimized solutions for different market scenarios which demand diverse requirements (e.g., in the areas of functionality, performance and isolation).

Figure 10:
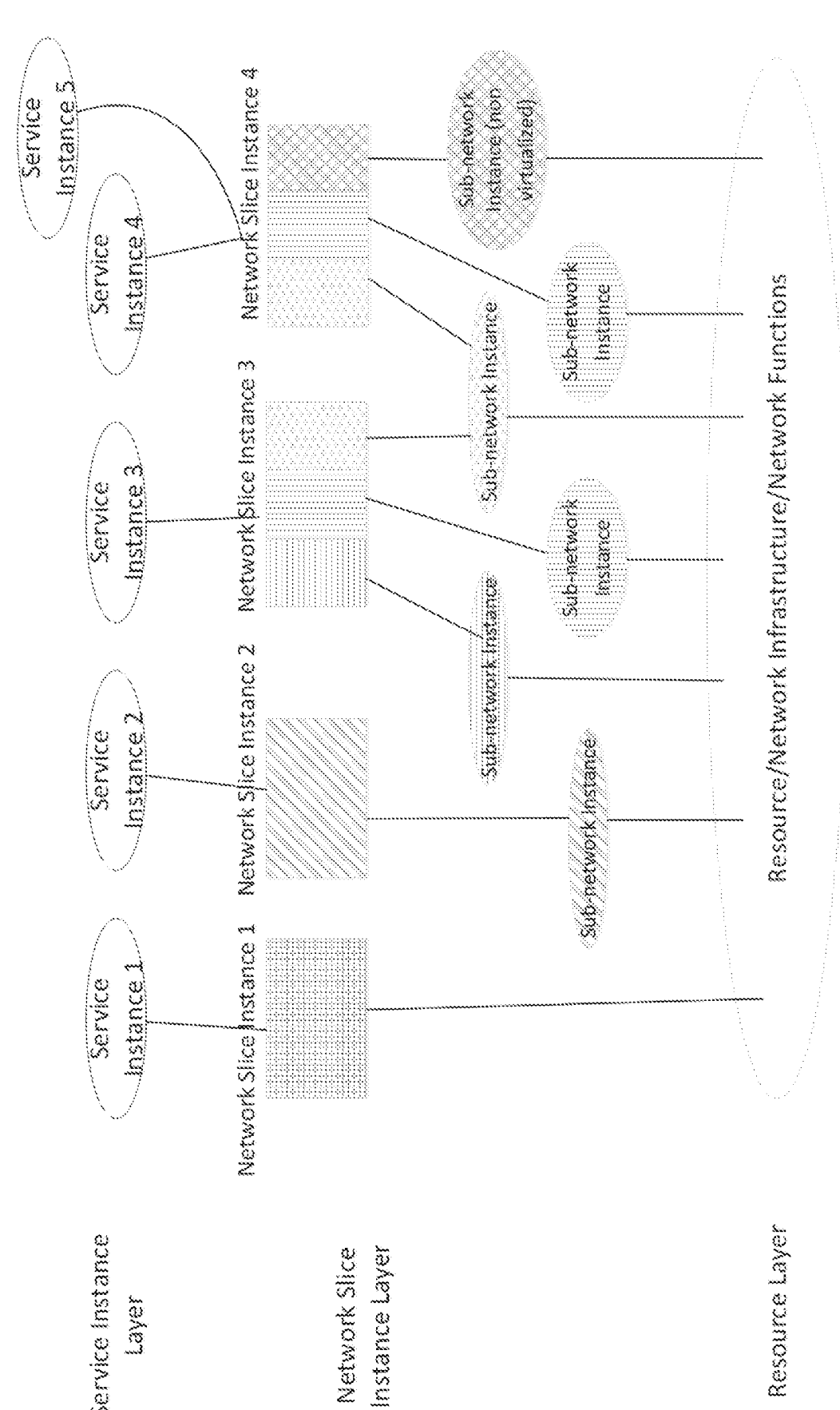
FIG. 10 shows a flow chart of an example method for network slicing.

FIG. 10 shows an example architecture of network slicing. A network slice instance is made up of a set of network functions and the resources to run these network functions. Different colors are used to indicate the different network slice instances or sub-network slice instances. A sub-network slice instance comprises a set of network functions and resources to run those network functions, but is not in itself a complete logical network. A sub-network slice instance may be shared by multiple network slice instances.

The 3GPP 5G network incorporates network slicing technology. This technology is a good fit for the 5G network, because the 5G use cases (e.g., massive IoT, critical communications, and enhanced mobile broadband) demand very diverse and sometimes extreme requirements. The current pre-5G architecture utilizes a relatively monolithic network and transport framework to accommodate a variety of services such as mobile traffic from smart phones, OTT content, feature phones, data cards, and embedded M2M devices. It is anticipated that the current architecture is not flexible and scalable enough to efficiently support a wider range of business needs when each has its own specific set of performance, scalability and availability requirements. Furthermore, introduction of new network services should be made more efficient. Nevertheless, several use cases are anticipated to be active concurrently in the same operator network, thus requiring a high degree of flexibility and scalability of the 5G network.

Network slicing enables the operator to create networks customized to provide optimized solutions for different market scenarios which demand diverse requirements (e.g., in the areas of functionality, performance and isolation). However, there are some challenges and issues to support network slicing in the future 5G network. Some example of these challenges and issues include but are not limited to the following:

How to achieve isolation/separation between network slice instances and which levels and types of isolation/separation may be required;

How and what type of resource and network function sharing can be used between network slice instances;

How to enable a UE to simultaneously obtain services from one or more specific network slice instances of one operator;

What is within 3GPP scope with regards to Network Slicing (e.g. network slice creation/composition, modification, deletion);

Which network functions may be included in a specific network slice instance, and which network functions are independent of network slices;

The procedure(s) for selection of a particular Network Slice for a UE;

How to support Network Slicing Roaming scenarios; and

How to enable operators to use the network slicing concept to efficiently support multiple third parties (e.g. enterprises, service providers, content providers, etc.) that require similar network characteristics.

The Privacy policy management (PPM) architecture described above offers a method by which only authorized parties are allowed to have access to the subscriber/user's personally identifiable information (PII). These authorization policies are build based on user preferences and ASP's privacy policies. Disclosed herein are methods and systems by which user data can be selectively anonymized. Proposed techniques involve data anonymization approaches such as data sanitization, abbreviation and substitution.

Every piece of data has value. When a piece of data is anonymized, some part of the data is hidden or manipulated so that data consumers cannot see or determine private information. Anonymizing data reduces its value as part of the information is lost. However, anonymizing data is sometimes necessary in order to meet legal requirements and/or to make people comfortable enough to share their data. For example, if municipalities are going to collect data and make the data available to data consumers (e.g., advertisers) via an open marketplace, privacy issues are going to arise. In order to address the privacy-related legal and political barriers to deploying a data marketplace or platform, data platforms may need to be able to offer privacy as a service. At a minimum, a Privacy Service may need to be able to provide a level of privacy based on user policies and the service providers polices. User's polices may be based on the personal preferences of the user who is associated with the data and service provider polices may be based on the internal business polices and legal requirements of the service provider.

A first use case is described herein with reference to machine learning and data processing. In the future, machine learning may be used to predict users, devices, and applications behavior and interests. For example, service layer systems might collect information about user, device, and application behavior. This collected information may be processed and used to generate algorithms that can be used to predict future behavior and interests. This step of generating an algorithm is a post processing operation that is not done in real time.

Once an algorithm has been established, data is collected in real time and the algorithm is applied to the data in order to make decisions such as how to allocate network resources and what information to send to users, devices, and applications, etc. Service Layers which store application data may also be responsible for anonymizing the data before providing it to the application or the Service Layer that applies the machine learning algorithm.

A second use case is described herein with reference to data collection by a municipality. Privacy issues arise when municipalities collect data and make the data available to data consumers via an open marketplace. Consider a file that contains all of a person's trash collection records (name, address, number and type of containers per collection, weight of each container). This information is valuable for many reasons; trash collection companies can use this information to plan and manage their assets and they can use this information for marketing purposes (when trying to obtain new customers or retain customers). However, political and/or legal issues may arise when municipalities expose this data. Real, or perceived, privacy concerns may cause voters/citizens to pressure the decision makers within the municipality to not collect data or to not make it available to consumers.

A third use case is described herein with reference to electricity consumption data. Consider a file that contains all the details of a family's electric consumption (resident names, resident ages, family address, list of all appliances/devices that consume electrical power, amount of power consumed by each appliance/device, times when each appliance/device is used, etc.). This information is valuable for many reasons; energy suppliers can use this information in marketing campaigns to target consumers. Appliance/device manufactures can use this information to tell consumers how much money they can save by switching to the latest, most energy efficient model. Energy distribution companies can use this information for infrastructure planning purposes. Although the file may contain valuable information, the file might contain information that cannot be shared. For example, the file may contain information indicating that there is a medical device in the home, when the device is used and how much energy was consumed by the device. It may be illegal to share this type of medical information; thus, the file is rendered useless.

Service Layer architectures today allow the service provider to configure who is authorized to consume a piece of data. PPM architecture, however, does not provide fine-grain control over information within user data. In particular, they do not allow the service provider to configure the system such that consumers can access part of data, modified versions of data, or sanitized versions of data. Thus, data consumers are not allowed to have any data, simply because part of the data set may be private. Furthermore, the access permissions that are associated with a given piece of data may depend on the data subject. However, current Service Layer architectures do not provide mechanisms to identify data subjects.

For example, a RESTful resource and its attached attributes may contain information about a person's electrical usage. The service provider is not able to configure the system so that some consumers can read all of the information in the resource while other consumers can only read part of the information (e.g., allow a data consumer to read a person's electrical consumption and general location, but not the person's identity and specific location). The service layer would have to be configured to know when to modify the location information from a specific location (e.g., house address) to a general location (e.g., township). The M2M/IoT service provider may also be required to hide the names of certain electrical appliances from the data consumer. For example, instead of showing the consumer that the person's medical equipment uses 150 kWh, the data may need to be sanitized such that mention of the medical equipment is not visible and the total amount of consumed electricity is removed accordingly.

Methods and systems are disclosed for how the service layer can be configured with polices to determine when to limit access to parts of data sets, modified data sets, and/or sanitized data sets. In doing so, the Service Layer may allow users/subscribers with options to select parts of data not to be shared, share user data completely or, completely preserve (protect) user data from being shared with the third party data consumers. This selection may be influenced or predicated by the quality of service or other incentives offered by the M2M/IoT Service Provider or Application Service Providers.

The IoT/M2M Service Layer architecture gathers data from different services it offers. This data may be valuable in many aspects and hence, IoT/M2M service providers use and share data with interested parties. However, user privacy may need to be protected when sharing the data.

Functionality that equips the IoT/M2M service layer with a capability to protect user privacy is disclosed. This functionality allows IoT/M2M service layer to anonymize subscriber/user data, especially when user data is shared with third party consumers. The proposed solution consists of two main services: a privacy policy service and a data anonymization service.

The privacy policy service helps the IoT server system to generate anonymization (privacy) policies based on inputs such as legal obligations, subscriber privacy preferences, and the data consumer's authorization level. Data anonymization (privacy) policies are output from the privacy policy service.

Data anonymization policies and the raw data that needs to be anonymized become inputs to the Data Anonymization Service (DAS). Raw data is then anonymized based on data anonymization policies. Thus, the output from the data anonymization service function is the privatized (anonymized) version of data.

A user profile is disclosed which captures information about a user/subscriber so that it can be associated with data that is stored on the service layer and used in generating polices about how much, or how little, data should be exposed to the data consumer. How user profiles may be created and modified and linked to other information that is stored in the service layer are also disclosed.

These aforementioned IoT/M2M service layer privacy service capabilities can be realized either as additional features in existing privacy and security functions or as an advanced feature for data privacy.

A privacy service that can be deployed within or along-side other systems (e.g., service layer systems) is described herein. The privacy service can be configured with polices to determine when and how to limit access to parts of data sets. For example, whether to provide access to modified data sets and/or sanitized data sets.

A key consideration when determining whether a piece of data should be exposed, not exposed, or anonymized is based on what user created the data or what user owns the piece of data. For example, one user might be comfortable exposing all of his data to third parties while a second user might want his data anonymized before it is exposed to third parties. Note that when choosing privacy preferences, options may include for users to selectively share personal data, share data completely or opt out completely from sharing user data. This selection decision may be predicated or influenced by quality of service or other incentives provided by the M2M/IoT service provider and/or ASP. In order to determine what polices should be applied when the privacy service processes data, the service layer and/or privacy service may need to be able to identify the user that is associated with the data.

It is proposed that user profiles be created independent of any application, service layer, or device registrations that are stored in the service layer system. Methods that allow the service layer system to link a user's profile with the applications, service layers, and/or devices are disclosed herein. For example, the idea of a link key is introduced. A link key is a key that may be associated with a device or a user. When devices register with the service layer, they may provide a link key that is associated with a user to prove that they are permitted to be linked with the user. The service layer may check that the provided link key matches the link key that is stored in the user's profile. Similarly, when users register with the service layer, they may provide a link key that is associated with a device to prove that they are permitted to be linked with the device. The service layer may check that the provided link key matches the link key that is stored in the device's profile.

Figure 11:
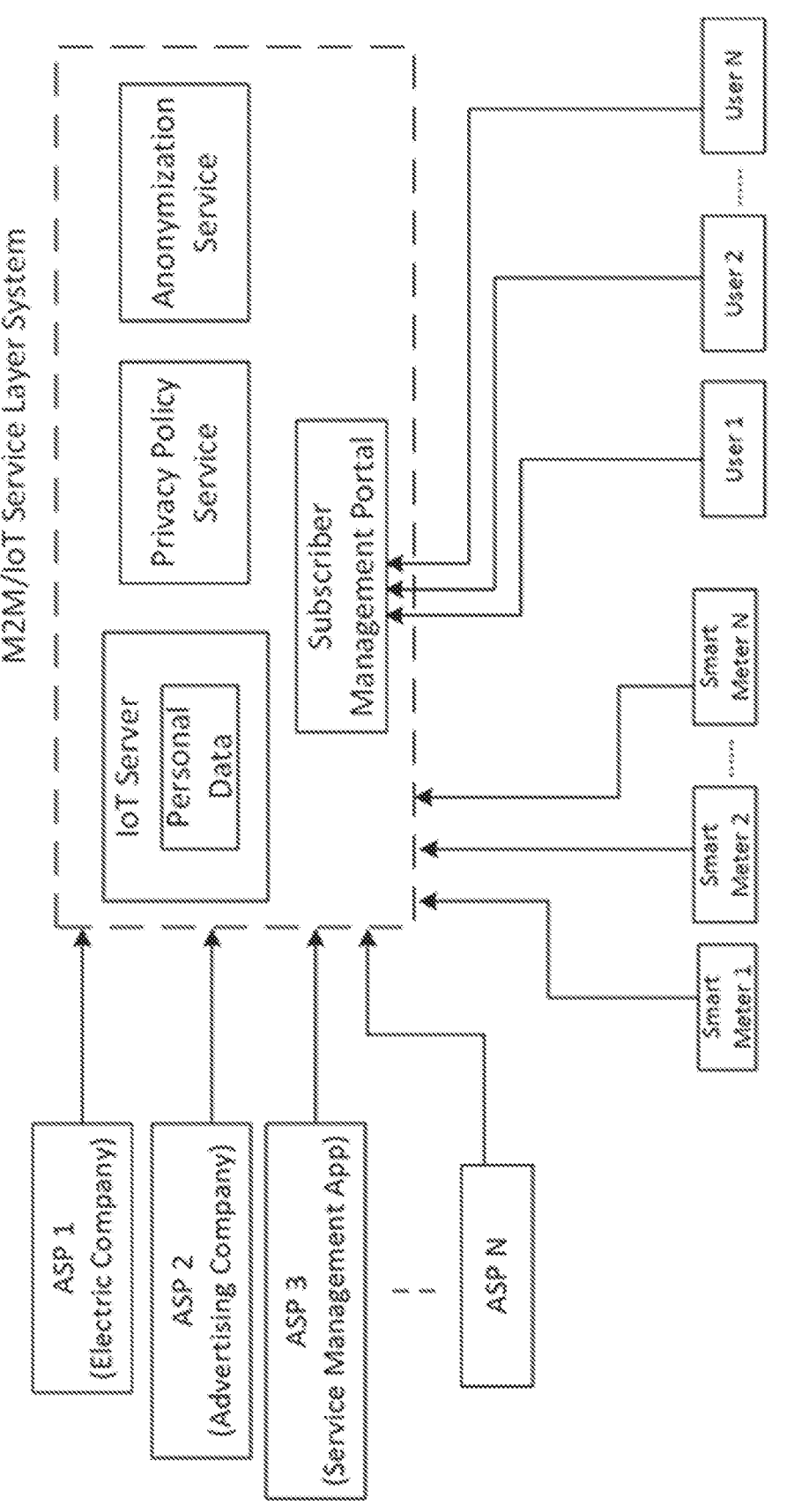
FIG. 11 shows a block diagram of an example M2M service layer platform.

FIG. 11 shows an example IoT/M2M Service Layer System that has been enhanced to provide privacy as a service. The IoT/M2M Service Layer System exposes a subscriber management portal (SMP) that may be used for creating user profiles. For example, users (e.g., User 1, . . . User N) can connect to the service layer via this portal and create their profiles. The service layer platform also allows application service providers (ASP) to access data that has been stored on the service layer by devices such as smart meters. How and whether data is provided by the service layer system to the ASP depends on the privacy policies and how the privacy service applies those polices.

Methods and systems for creating user profiles are disclosed.

Any piece of data in the M2M System, and the users that can access the data, may be governed by a set of policies. The policies that apply to a given piece of data may be determined by what subscriber the data applies to, who is requesting to consume the data, and the policies of the service layer system. Service Layer standards (e.g., oneM2M) currently provide no way of identifying a subscriber. Subscribers are users that sign up for the services offered by the M2M/IoT service layer. Therefore, users can be referred to as subscribers.

It should be appreciated that, although this section describes how to identify a subscriber, or user, who is associated with a piece of data, the same techniques may be used to identify a third party consumer who is attempting to consume a piece of data. The user's information may be captured as a User Profile in the IoT/M2M service layer platform. A user profile can have information such as that shown in Table 2.

TABLE 2

User Profile

| Field | Description | Examples |
| --- | --- | --- |
| Profile Identification | | |
| Name | Name of the user who would like to receive access to IoT devices leased by Application Service Provider (e.g., Electric Company) | John Spade, Mary Dante |
| Subscriber-ID | A unique alphanumeric identification for the subscriber | xyz1432klm |
| Street Address | Street address where the subscriber resides | 1234 E. Hector Ave, Philadelphia, PA 19145 |
| Unit Type | Business or household. It can be further categorized as small business, medium large business. Similarly, small, large or medium household based on the number of IoT devices deployed. | Medium household (less than 20 IoT devices) |
| Associated Users | Users that reside in the same unit/address who have access rights other than the registered subscriber, authorized by the (primary) user. | 1. Kathy Spade 2. Sam Smith 3. Dan Holly |
| Linked Applications, Devices, and service layers | Name or Identification of devices, applications, and/or service layers that are linked to the Subscriber-ID. The user profile may also specify how each of his linked data sources should be protected. | Smartmeter501, MedicalDevice112, Nest321, GarageLock232, A234-43543H-5623434 |

TABLE 2-continued

User Profile

| Field | Description | Examples |
|---|---|---|
| Device/Application/Service Layer Linked Policies | The privacy policies that the user would like to be applied when exposing information to each of its linked devices, applications, or service layers. | |
| Associated Identifiers | Other identifiers that are associated with the user. | Email addresses Driver's License Number Social Security Number |
| User Link Key | When devices, applications, or service layers request to be linked with this user, they may need to provide this user link key to prove that they are authorized to be linked with this user. | |
| Alias | A user profile may have one or more alias(s) associated with it. An alias may be used when anonymizing the data. For example, a user name alias may be used by the DAS to replace identifying information. Aliasing may be performed on fields other than the user name. For example, aliasing maybe performed on the user's home address. | A random string. A hash of the field that is being anonymized and some other identifying user information. |
| Privacy Protection Rules or Privacy Protection Rules ID | Rules that describe how the user would like his data to be protected, privatized, or anonymized. Alternatively, this could be a Privacy Protection Rules ID that points to a set of rules. | See Table 3 |

TABLE 3

Fields of the User Privacy Protection Rules

| Field | Description | Examples |
|---|---|---|
| *Rule Identification* | | |
| Name | Name of the user who would like to receive access to IoT devices leased by Application Service Provider (e.g., Electric Company) | John Spade, Mary Dante |
| Subscriber-ID | A unique alphanumeric identification for the subscriber | xyz1432klm |
| Privacy Protection Rules ID | A unique representation to identify a privacy protection rule. | PPR1, PPR2 etc. |
| *Protected Data (in addition to PII)* | | |
| *A list of data that the user would like to be protected, anonymized, etc., and how that data should be protected, anonymized, etc.* | | |
| Name | A description of how the user would like their name to be protected. | Not shared, substituted, aliased, encrypted, etc. |
| Street Address | A description of how the user would like their address to be protected. | Not shared, substituted, aliased, encrypted, etc. |
| Associated Users | A description of how the user would like their associated user names to be protected. | Not shared, substituted, aliased, encrypted, etc. |
| Associated Identifiers | A description of how the user would like their associated identifiers to be protected. | Not shared, substituted, aliased, encrypted, etc. |
| *Third Party Rules* | | |
| Allowed third Parties | Third Parties (other entities) that are allowed to consume data related to this user. | |

TABLE 3-continued

Fields of the User Privacy Protection Rules

| Field | Description | Examples |
|---|---|---|
| Restricted third Parties | Third Parties (other entities) that are allowed to consume data related to this user with certain restrictions. | |
| Disallowed third Parties | Third Parties (other entities) that are not allowed to consume data related to this user. | |

Note that policy protection rules may include specific criteria that may need to be met in order for a third party to become an allowed, restricted, or disallowed party. For example, a policy protection rule may indicate that a third party may become allowed if the third party data consumer may offer incentive of some form in order to be allowed to consume the user's data.

Table 3 depicts the details of the user privacy protection rules. IoT devices, applications and service layer entities may also store information about themselves on the service layer. This information is typically provided to the service layer when the device, application, or service layer registers with the Service Layer. The data is then manipulated during the course of normal operation. Table 4 shows the information that may be included in an IoT device, application, or service layer profile and used to help determine what privacy policies to apply to service layer requests.

TABLE 4

| | IoT Device, Application, or Service Layer Profile | |
|---|---|---|
| Field | Description | Examples |
| Device, Application, or Service Layer Identifier | Name of the IoT device, application, or service layer | Nest1 |
| Location | Location of the IoT Device | 7845 N Hillside, Wichita, KS 78251 51.5074° N, 0.1278° W |
| Data Location | Data or storage location or database location of the data | /HDD1/folder1/subfolder2/file1 |
| Linked Subscriber-ID's | Unique alphanumeric identification of subscriber that a particular device(s), application(s), and service layer(s) that the device, application, or service layer is linked to. | xyz1432klm |
| Device type | Device type representing its objective and function. | Medical device |
| Application type | Application type representing its objective and function | medical device application |
| Service Layer type | What services the Service Layer Provides | Home Automation, Medical Device tracking |
| Device (or application or Service Layer) Link Key | When users request to be linked with this device, application, or service layer, they may need to provide this link key to prove that they are authorized to be linked with this device, application, or service layer. | |
| Privacy Protection Rules | Rules that describe how data that is associated with the device should be protected, privatized, or anonymized. | PPRule1, PPRule2 etc. |

Figure 12:
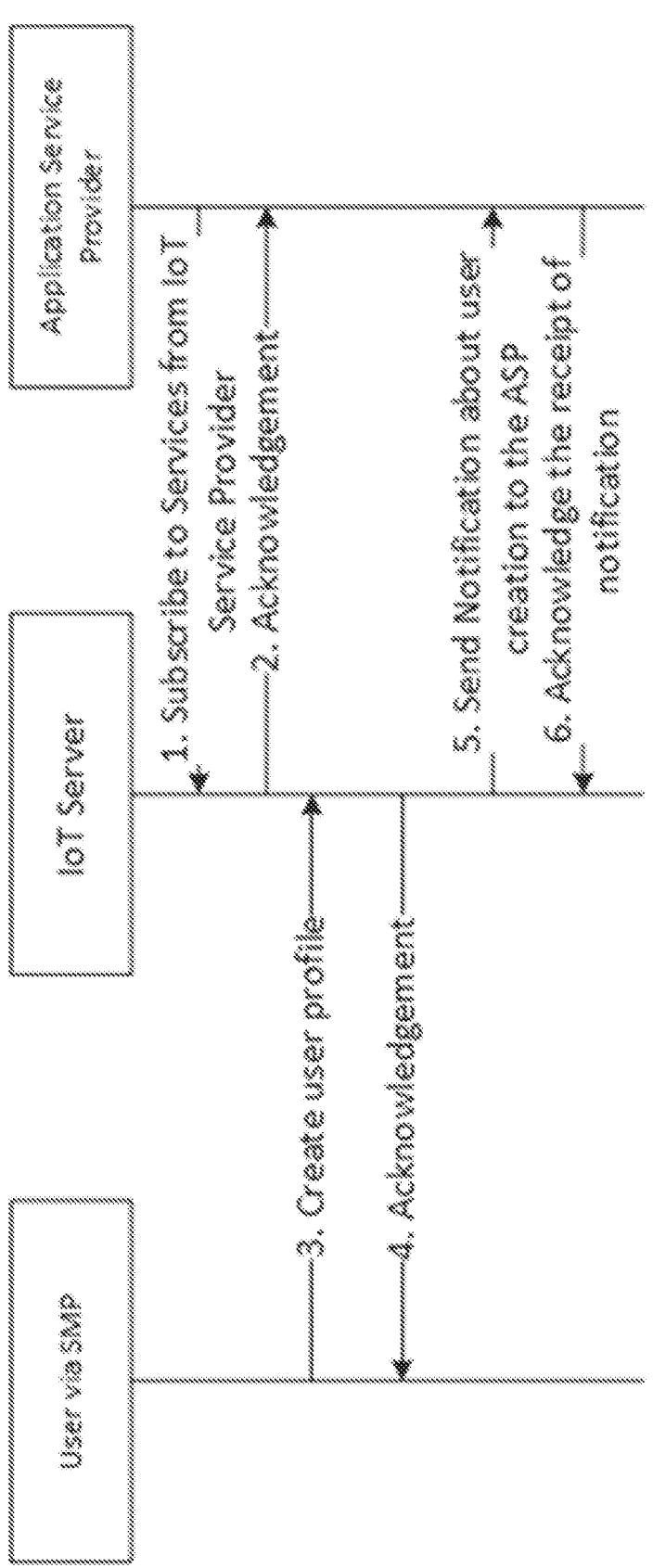
FIG. 12 shows a flow chart of an example method for user profile creation in a service layer.

A user profile, such as the one shown in Table 2, may be created when a user registers herself to an IoT service layer platform via IoT Service Layer's subscriber management portal. This process is shown in FIG. 12. The procedure of FIG. 12 also shows how an application service provider (ASP) (e.g., an electric company, advertising company, etc.) may subscribe to be notified when a user that matches certain criteria (e.g., location, name, etc.) is created. The IoT/M2M Service Layer System may then send a notification to the ASP when a matching user is created. The ASP may then take some action based on the notification such as a request to read data that is associated with the user. Example details of FIG. 12 are described below:

At step 1, an application Service Provider (ASP) subscribes to IoT/M2M Service Layer's services (e.g., notification services). The subscription request may indicate that the ASP wants to be notified if any of the following events occur:

A particular user creates a profile;

A particular user profile is modified;

The user(s) that are associated with a particular device, application, or service layer change;

A user profile is created or modified and the profile is associated with a particular device, application, or service layer type;

A user profile that is associated with a particular group is created or modified;

A user profile that matches some criteria is create or modified. The criteria may be that the user is associated with a certain location. The criteria may be that some parameter in the user profile, such as any of the parameters listed in Table le 2, is assigned to a certain value or range of values; and/or A user profile is created with a particular link key.

At step 2, the service layer sends an acknowledgement back to ASP confirming the creation of the subscription. This message indicates if the subscription was created or not. If the subscription was not successfully created, this message may indicate a cause value for the failure.

At step 3, a user creates their user profile in the IoT service layer via a Subscriber Management Portal (SMP). The Subscriber Management Portal may be accessed using RESTful protocols. The items that are configured during the user profile creation and are provided in the message are listed in Table 2. The service layer may also use the contents of this message to create an entry in its database for the new user. Furthermore, if the request indicates that the new user profile should be associated with device(s), application(s), or service layer(s) that are already registered with the IoT Server, the IoT Server may update the profile of the device(s), application(s), or service layer(s) to indicate that they are linked with the user. This process of linking a user profile to device(s), application(s), or service layer(s) is discussed further below. If the request included a link key, the IoT Server may check that the profile(s) of the device(s), application(s), or service layer(s) indicate the same link key.

At step 4, as the user profile creation is completed, the service layer sends back acknowledgement to the subscriber management portal confirming the creation of the user profile or indicating a failure cause.

At step 5, based on the subscription that was configured in step 3, or the device(s), application(s), or service layer(s) profiles that were updated in step 3, the Service layer sends a notification to the ASP.

At step 6, upon receiving the notification from the IoT server, the ASP confirms the receipt by sending an acknowledgement back to the IoT server.

Methods and systems are disclosed by which devices, applications, and/or service layers are linked with a user profile.

Linking a user profile may result in:

The user profile record or resource being updated to record the fact that the user is associated with the linked device(s), application(s), and/or service layer(s);

The records or resource(s) that are associated with the linked device(s), application(s), and/or service layer(s) being updated to record the fact that they are associated with the user; and/or A trigger or notification to the interested parties about the link being created.

A user profile may be linked with a device, application, or service layer. In an example where the linked device, application, or service layer is already registered with the service layer when the user profile is created, linking may occur.

Figure 13:
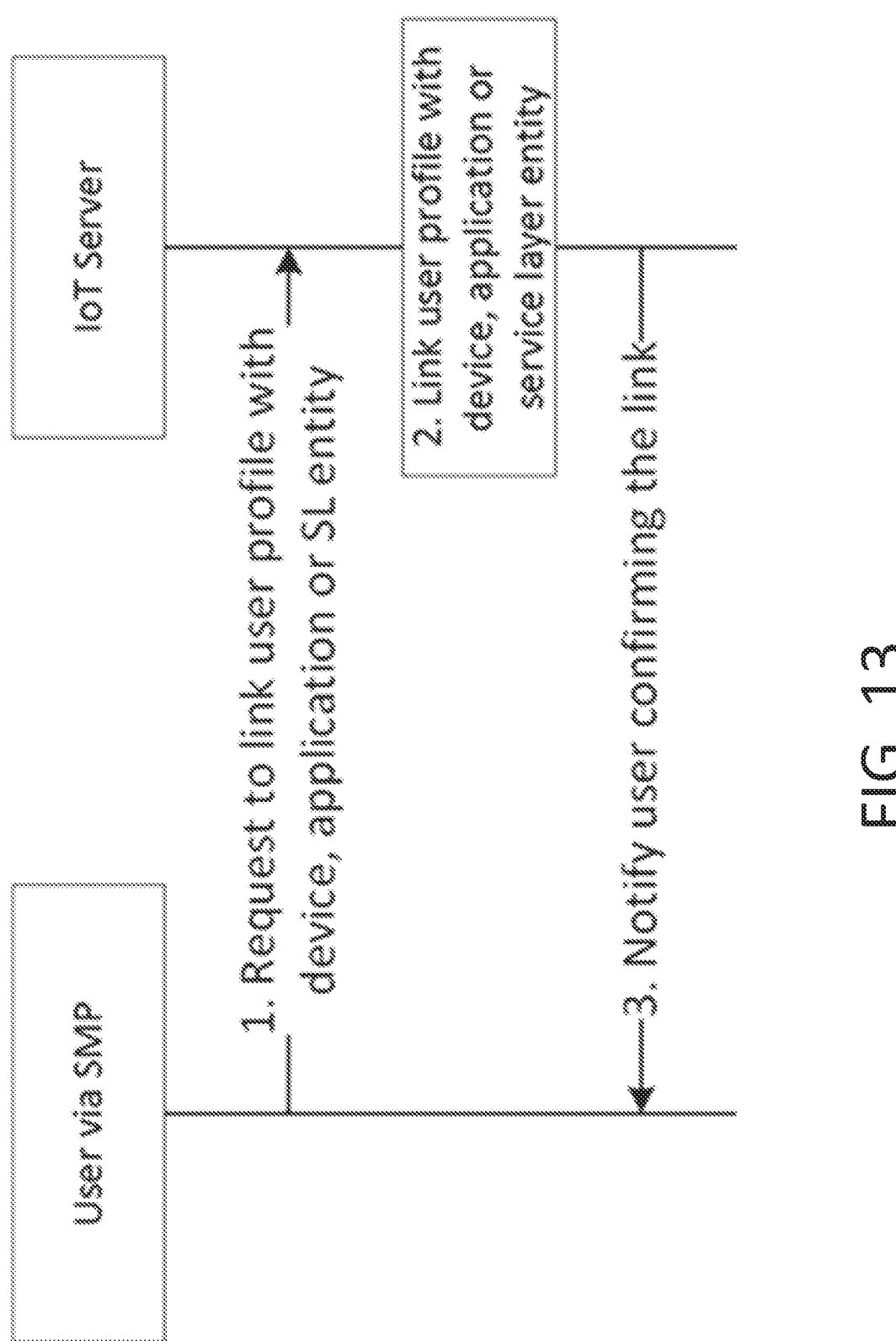
FIG. 13 shows a flow chart of an example method for linking a user profile with a device, application or service layer entity.

Once the user profile is created, the user may provide the identities of the application(s), device(s), and/or service layer(s) that the user should be linked to when the user profile is created (e.g., in step 2 of FIG. 13).

Additionally or alternatively, after the user profile is created, a separate request on the SMP may be used as a request to link the user profile to the application(s), device(s), and/or service layer(s).

Figure 14:
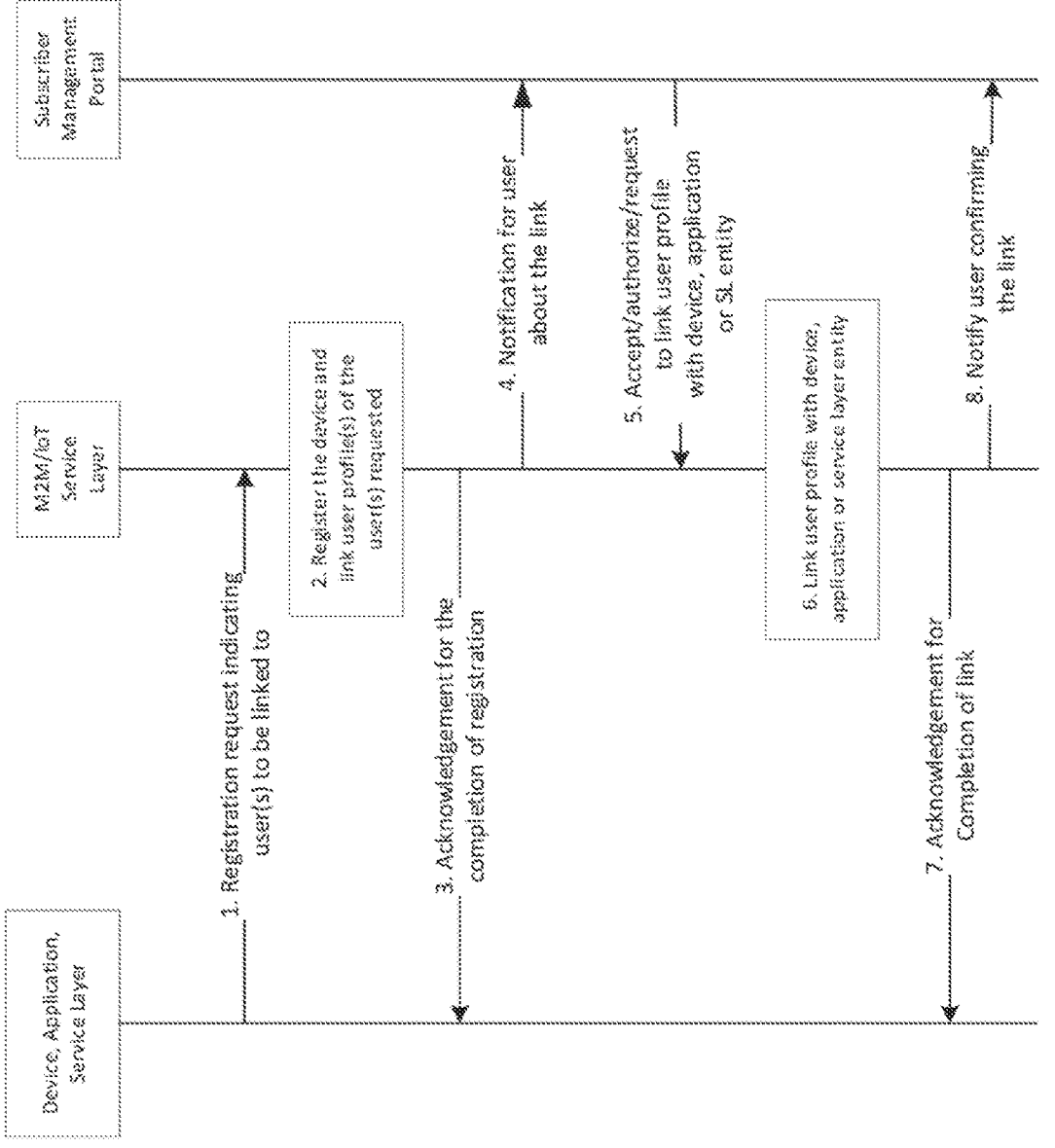
FIG. 14 shows a flow chart of an example method for linking a user profile during device, application or service layer registration.

In the case where the linked device, application, or service layer is not yet registered with the service layer when the user profile is created, the linking may occur:

When the device, application, or service layer registers, it may indicate what user it should be linked to (an example of this is shown in steps 1-3 of FIG. 14); and/or When the device, application, or service layer registers, a notification may be sent to the user via the SMP indicating that the device, application, or service layer has registered. The service layer may be programmed to send this notification based on a previous subscription request that was received from the user, via the SMP, indicating that the user wants to be notified if a particular device, particular application, particular device type, application type, or service layer type registers or if a device, application, or service layer meeting some criteria registers. An example of this is shown in FIG. 14.

FIG. 13 shows an example method by which a user profile is linked with a registered device, application, or service layer based on a user request from the management portal (SMP).

At step 1, a user with a user profile sends a request for linking their user profile with an existing registered device, application or service layer entity via SMP. This message may include the identity of the device, application or service layer entity, the user profile identity and the associated link key.

At step 2, the IoT/M2M Service Layer receives the request and processes the request. Processing the request may include checking that the link key that was provided in step 1 matches the link key in the profile of the device, application, or service layer that the user wants to link to. This may result in populating or updating the record or resource representation of the linked device, application or service layer and the record or resource representation of the user to indicate the link or association. Therefore, the information in Table 4 may be linked together with Table 2 at this time.

At step 3, a notification about the completion of the process and result of the request may be sent to the user via the SMP. This notification may indicate whether the user's request was successful and, if successful, the information on linked device, application or service layer entity may also be sent as part of the notification.

FIG. 14 shows an example flow chart of how a user profile may be linked with a device, application, or service layer when the device, application or service layer registers with the IoT Server:

At step 1, a device, application or service layer sends a registration request to the IoT server including the user(s) with whom the device, application or service layer is desired to be linked. The request may include a link key.

At step 2, upon receiving the request, the IoT service layer platform registers the requesting device, application or service layer with IoT Server and, in addition, the user profile(s) of the user(s) indicated in the request are linked with the requesting and registered device application or service layer. The IoT Server also checks that the link key that was provided in step 1 matches the link key in the record of the user that the requestor wants to link to. This may result in populating or updating the record, the resource representation of the linked device, application or service layer and the record, and/or the resource representation of the user to indicate the link or association.

At step 3, an acknowledgement is sent back to the device, application or service layer about success or failure of the registration and linking process with the user(s) indicated.

At step 4, the IoT Server sends a notification to the SMP about the link-request made by the device, application or service layer. The notification may be forwarded to the user.

At step 5, based on the type of notification received, user(s) may accept or authorize the IoT server. Additionally or alternatively, the user(s) may send a request to link their profile with the requesting device, application or service layer.

At step 6, upon the consent of the user, the M2M/IoT service layer platform completes the linking process of user profile(s) with the requesting device, application or service layer. This may result in populating or updating the record or the resource representation of the user(s) to indicate the link or association. For example, Table 4 may be linked together with Table 2.

At step 7, the IoT server sends an acknowledgement back to the requesting device, application or service layer about completion of the link between user(s) requested and device, application or service layer.

At step 8, the IoT service layer sends a notification to the user(s) via the SMP about the completion of the link between user profile(s) of the user(s) requested and the requesting device, application or service layer.

It is understood that a device, application or service layer may be linked with multiple user profiles.

A Privacy Policy Service (PPS) is disclosed that may be used to retrieve a policy that may be used to determine how data should be anonymized before being provided to a data consumer. For example, if an ASP makes a request to read a resource that is stored on the IoT Server, the IoT Server may retrieve a policy from the PPS. The policy may be based on the identity of the requestor, the user who is associated with the requested data, and/or local polices.

The inputs and outputs of the PPS are shown in Table 5 and Table 6, respectively. Note that it is possible to retrieve polices based on the user that is associated with the data or the type of data that is being requested.

TABLE 5

| | PPS Inputs | |
|---|---|---|
| Inputs | Description | Examples |
| User ID | User's name or unique identification | Sam Smith, A12334 |
| User Profile | Details of the User's Record. | See Table 2 |
| Date range | Time ranges based on which the policies generated are applicable | May 29, 2011 to May 28, 2017 7:00 AM to 12:00 AM |
| Allowed duration for correlated data collection | Allowed lengths of time for data collection | 2 hour(s), 1 minute(s) |
| Data source | Identity of the source from where data was brought/collected | Comcast, Sam Smith |
| Data source type | Nature of data source. | Household, business, small business, financial institution, educational institutions etc. |
| Data group | Data group specific to data based on time, distance, location, user age, user group, etc. | 1 mile-5 miles, Conshohocken PA Office, 40-50 years |
| User/Subscriber privacy preferences | Degree of privacy user wants | See Table 3 |
| Data Type | Nature of data. | Image, text, number, coordinates, sound etc. |
| Location where data collected | Mailing address with/without business name | 102 Hector St, Conshohocken, PA |
| Location precision | Sensor location may be coordinates | In-house, Lamp-pole no. 1234, etc. |
| Data consumer category | Category or nature of business of the consumer. This may include specific Data consumer IDs | Education institution, Accounting service, Medicine research, etc. |
| Data consumer location | Mailing address of the data consumer or where the business or user is registered | 1581 Main St, Philadelphia, PA 19158 |
| Request time range | Time duration of request. | 9 PM-4AM |
| Government privacy law | Privacy policies imposed by the government | User consent required, Data collection between age 0-2 years not permitted |
| Origin of request | Location of the computer where the request originated | Server location = California |
| Data rank | Data may be ranked | Confidential, classified or premium, basic, etc. |
| Raw data storage constraints | Post-processing data storage constraints for raw data | Raw data should be deleted immediately after anonymization, after a certain time or number of operations, not changed, etc. |
| Anonymized data storage constraints | Post-processing data storage constraints for anonymized data. | Anonymized data can be stored at the same location with raw data, and with the same access control policies. Anonymized data can be sent only to the requester, no local storage. |
| De-anonymization information storage constraints | Post-processing data storage constraints for raw data | De-anonymization information may be stored at a specific Vault location. De-anonymization information may be stored by the SL and may be used to respond to specified queries |

TABLE 6

| | PPS Outputs | |
|---|---|---|
| Outputs | Description | Example |
| Applicable Data anonymization policies | Policies that detail what anonymization technique to use | Abbreviate > User names, Sanitize > street names, shuffle > |

TABLE 6-continued

| PPS Outputs | | |
| --- | --- | --- |
| Outputs | Description | Example |
| | | temperature etc., where ">" indicates a command or instruction. |
| (Optional) Anonymization parameters | Specific anonymization parameters to be used with this policy. | For example, the anonymization method, algorithm strength, etc. The input is required when enabling anonymization to be performed via (distributed) DDS which may not be equipped to derive these parameters from the applicable data anonymization policy. |
| Allowed Operations | What actions may be performed on the retrieved data. | Delete, Read, Alter, etc. |

Based on the inputs received, the PPS may build a policy that can be used to determine how data should be modified before being provided to the data consumer (ASP). The policy may be based on the following factors:

User/Subscriber preferences: user preferences contribute to a user's decision to hide or not hide parts of user data that they may consider private. A user may also indicate the target consumer type whom they may not want to have the data. Even if the data may be consumed by a third party, the user can control the personal information they may not want to share. These preferences (described in Table) may be provided to the PPS with the request to create a policy;

Laws imposed by a local governing body: existing local governing body policies may impose some rules that may force or allow a user to share specific information. For example, local law may not allow IoT service providers to share or trade user data without user's consent or based on the target consumer (e.g., Healthcare Department). It may be necessary to share person's age, height, and previous medical conditions. These preferences may be obtained by PPS from local policies; and/or Data consumer preferences: This may be regarded as a management policy as opposed to a privacy policy. The data consumer may be allowed to choose the level of precision on a user's profile or a device, application or SL entity's profile, and raw data. This preference metric may be important in making decisions on what data may be delivered to the data consumer based on the price paid. These preferences may be obtained by PPS via pre-provisioning or may be implemented as local policies.

The factors above may have some precedence associated with them. For example, certain laws imposed by the local governing body may precede User/Subscriber preferences, and certain User/Subscriber preferences may precede Data consumer preferences. The precedence may be based on local configurations.

The policies may indicate if the data should be aliased, sanitized, masked, etc., as described in more detail below. Furthermore, the policy may indicate that the data should only be anonymized, or anonymized differently, if certain conditions are met. For example, some data may only need to be aliased if it was generated while the device was in a certain location.

A Data Anonymization Service is disclosed that may receive as its input a policy and a set of data (or pointers to policies and data) and produce an anonymized data set and/or a pointer to an anonymized data set. Example inputs and outputs of the Data Anonymization Service are shown in Table 7 and Table 8, respectively.

TABLE 7

| Data Anonymization Service Inputs | | |
| --- | --- | --- |
| Inputs | Description | Example |
| Data | Raw data | "name": "Sam Smith", "age": "52", "SSN": "155-85-5989", "address": "1001 E Hector St. Suite 820, Conshohocken, PA", "affiliate": {"IEEE", "AAA"} |
| Applicable data anonymization policies | Applicable anonymization policies created (for example) by the PPS. | Abbreviate > User names, Sanitize > street names, shuffle > data Mask > SSN Mask > affiliation etc., where symbol ">" indicates a command or instruction. |

TABLE 7-continued

| Data Anonymization Service Inputs | | |
| --- | --- | --- |
| Inputs | Description | Example |
| (Optional) Anonymization parameters | Anonymization parameters derived by PPS to be used for this request | For example, the anonymization method, algorithm strength, etc. The input is optional if DDS is equipped to derive these parameters from the applicable data anonymization policy. |

TABLE 8

| Data Anonymization Service Outputs | | |
| --- | --- | --- |
| Outputs | Description | Example |
| Anonymized data | Data that complies with all the data privacy requirements | "name": "SS", "address": "Conshohocken, PA" |
| (Opt) De-anonymization parameters | Data that enables de-anonymization | Tables with mappings between names and aliases. These may be stored in a secure location, such as a Vault. Depending on the applicable policies, this information may be allowed to be stored by the SL and used to respond to queries for data from authorized entities. |

User data can be anonymized using a combination of one or more anonymization techniques. Example techniques used to anonymize user data may include one or more of the following:

(1) Sanitized Data: parts of user's personal data can be hidden/masked to preserve their privacy. For example, an electric bill of a household may have user's name, street address with house number, number of members living in that unit, number of devices, type of devices, name/brand of devices, etc. Some explicit parts of personal information can be sanitized/masked.

(2) Modified Data:

(a) Abbreviation: some of the data such as names may be represented with its initials. For example, Robin Sharma can be abbreviated as RS.

(b) Substitution: having names attached to data increases the value of data. However, names can be substituted with random numbers or letters or other generic names. For example, Robin Sharma can be substituted by DHMCQSXLKZS. Other substitution schemes may use aliases or abbreviations, for example, Robin Sharma can be abbreviated as RS or aliased with James S. Camron.

(c) Shuffling: similar to substitution but with records among the data. This may be effective only in big data sets. For example, electricity consumption data collected over a zip code can be valuable even if the data is mixed as that data can still reveal a macro view of electricity consumption about that zip code.

(d) Encryption: encryption can help to protect the confidentiality of data. Only a related party with the right key may view the data. This may be important when transferring data over a wire or scenarios where some parts of the data are made available to specific people with secret keys. For example, if two parts of data in a file are encrypted with two different keys and keys are given to dedicated people in an organization (according to rank), different file receiving parties can view different sets of data within a file.

Figure 15:
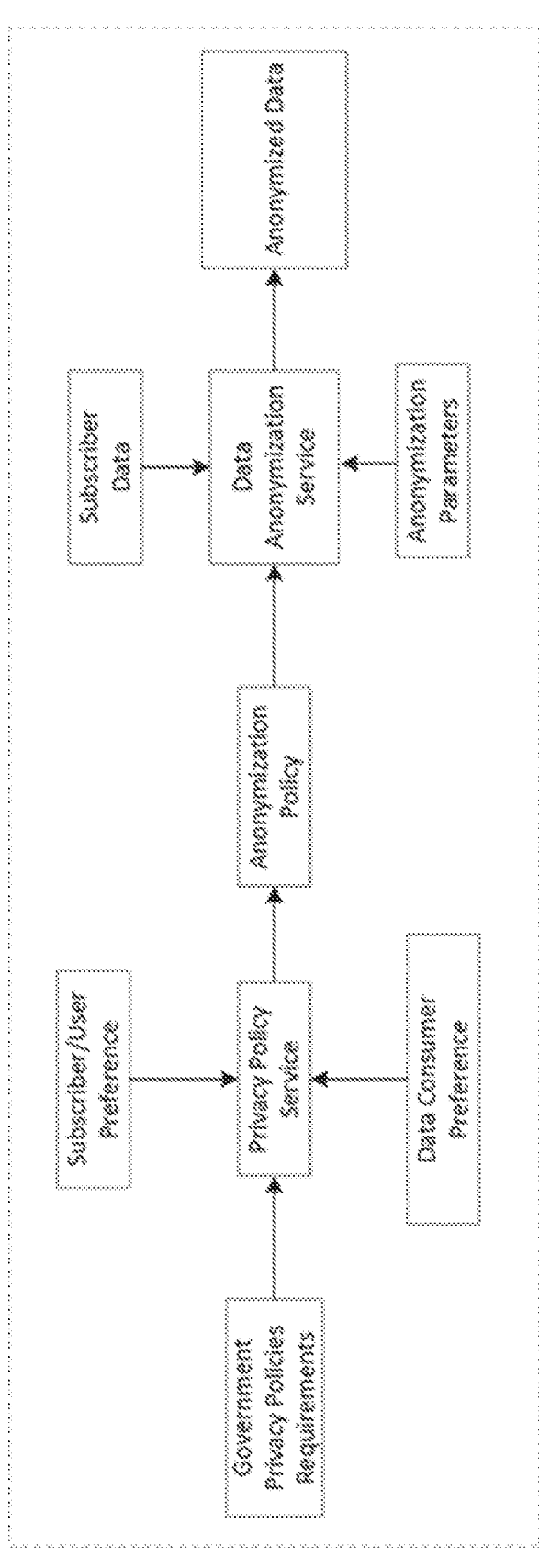
FIG. 15 shows a flow chart of an example method for a data anonymization procedure.

A Data Anonymization Procedure is disclosed herein. FIG. 15 shows an example pictorial representation of the policy creation and data anonymization process. A data anonymization policy may be based on three major components: data policies/laws defined by a governing body, subscriber/user's anonymization preferences, and data consumer needs. The Privacy Policy Service (PPS) produces applicable privacy policies based on these requirements. Policies may then be used by the Data Anonymization Service (DAS) along with the raw data that needs to be anonymized and the anonymization parameters pertaining to the specific data request. The Data Anonymization Service may compute an anonymized (privatized) form of the data as its output. The Anonymization Service may use techniques such as k-anonymization to anonymize data. The anonymization parameters, such as K, may be generated by the PPS, placed in the policy, and provided to the DAS as part of the policy. In other examples, the DAS may perform operations such as Homomorphic encryption or Differential Privacy. The parameters to configure these anonymization/encryption techniques may be generated by the PPS, placed in the policy and provided to the DAS as part of the policy.

Two variants of the data anonymization procedures may be described.

The first variant may be better suited for deployments where both the PPS and the DAS are centralized (e.g., in an IoT Server). The raw data host may also be the IoT server, or a distributed IoT node such as a Gateway. In this alternative, the PPS provides not only the anonymization policies, but also the anonymization parameters for each request, which are provided to the DAS along with the raw data.

The second variant may be better suited for deployments where the PPS is centralized, but the DAS services are provided in a distributed manner, especially when the DAS services are co-located with the raw data hosts. In this alternative, the PPS provides only policies and the anonymization parameters may be produced by the DAS based on policies and the raw data request.

Figure 16:
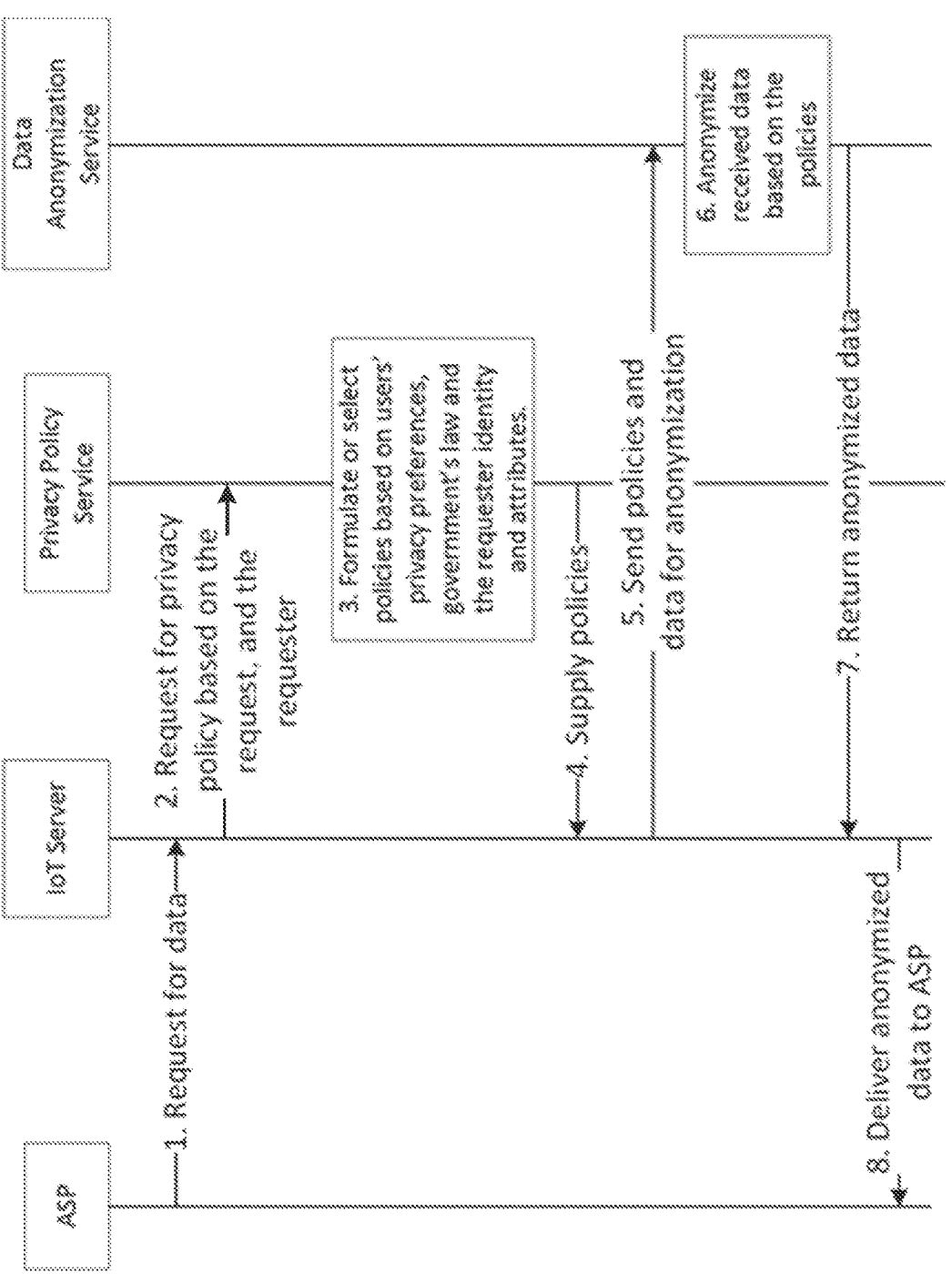
FIG. 16 shows a flow chart of an example method for using privacy services for data anonymization.

FIG. 16 shows a flow chart of an example method for a data anonymization procedure in accordance with the first variant.

At step 1, the ASP sends a request for user data to the IoT service layer platform. The request may include the ASP's credentials and attributes. For example, the ASP's AE application may send a request with attributes such as User Category=Finance, Date Range=May 1, 2016 to Apr. 30, 2017, Location=Zip 19126, etc. The request may further comprise user credentials such as a User ID that consists of user's first name and last name.

Alternatively, the ASP may be a party that is authorized to delete data from the IoT Server's storage. For example, the request may indicate that all data that is associated with a particular user, or group of users, category, etc. should be deleted. The request may be further qualified that all data that was generated within a certain date range or location should be deleted.

At step 2, the IoT server interprets the request from the ASP and sends an inquiry to the privacy service for an appropriate privacy policy that may be applied to the data requested by the ASP.

At step 3, based on the ASP's credentials and attributes, the Privacy Policy Service (PPS) retrieves the appropriate databases for the user data preferences and the privacy laws of the user's location. Based on the retrieved information, unique privacy policies applicable to user data for the request may be formulated. For instance, user preferences may include: Abbreviate>User ID AND Sanitize>Street Name AND Sanitize>SSN AND Encrypt>Date of Birth etc. Here, ">" indicates command or instruction. In one example, an ASP may send the same request multiple times. Policies constructed in the past may be stored in the M2M/IoT service layer, which may be reused later.

At step 4, the PPS formulates anonymization policies and sends them back to the IoT server.

At step 5, the IoT server sends the requested user's raw data and the applicable policies to the Data Anonymization Service (DAS). For instance, a complete policy may be as follows:

Policy 1: Enforce>User preferences AND Enforce>User consent to share data

Policy 2: Abbreviate>User ID AND Sanitize>Street Name and Sanitize>SSN AND Encrypt>Date of Birth.

Alternatively, the policy may indicate to the DAS whether certain operations should be performed on the data (e.g. delete, modify, erase, etc.).

At step 6, raw data and applicable policies are received by the Data Anonymization Service as its input. Data may be anonymized based on the policies. As a result, an anonymized version of data that meets all the requirements is produced. For example, anonymized version of a "User ID"; "Sam Adams" may be "User ID": "SA" (abbreviation), "Address": "Philadelphia, PA", "SSN": " ", "Date of Birth": "Nv/gQsVqxRa460ib1RYgRfw==IwEmS".

At step 7, an anonymized version of data is sent back to the IoT server.

Alternatively, if the policy that was provided in the step 5 indicated that data should be deleted, then this message may be an indication of whether or not deletion was successful.

At step 8, the anonymized version of the requested data is delivered back to the requesting ASP. Note that the reply may include an indication that the data has been anonymized. Furthermore, the reply may indicate what anonymization techniques were applied to the data. The ASP may follow up to this reply with a request for complete access to the data set.

Alternatively, if the policy that was provided in the step 1 indicated that data should be deleted, then this message may be an indication of whether or not deletion was successful.

The IoT Server may create a record (e.g. a charging data record) of who requested the data, what data was requested, what data was provided, how the data was anonymized, what data was deleted etc.

Note that anonymization policies may also be based on a price/cost factor that allows the IoT Service layer platforms to have a variety of data for varying prices/anonymity. However, a minimum level of anonymity as per the existing government policy/law may need to be enforced.

Various ranks or grades of anonymization may also be implemented for simplicity of computation and management purposes. These grades of anonymization may be modeled based on price and anonymity preferences.

Figure 17:
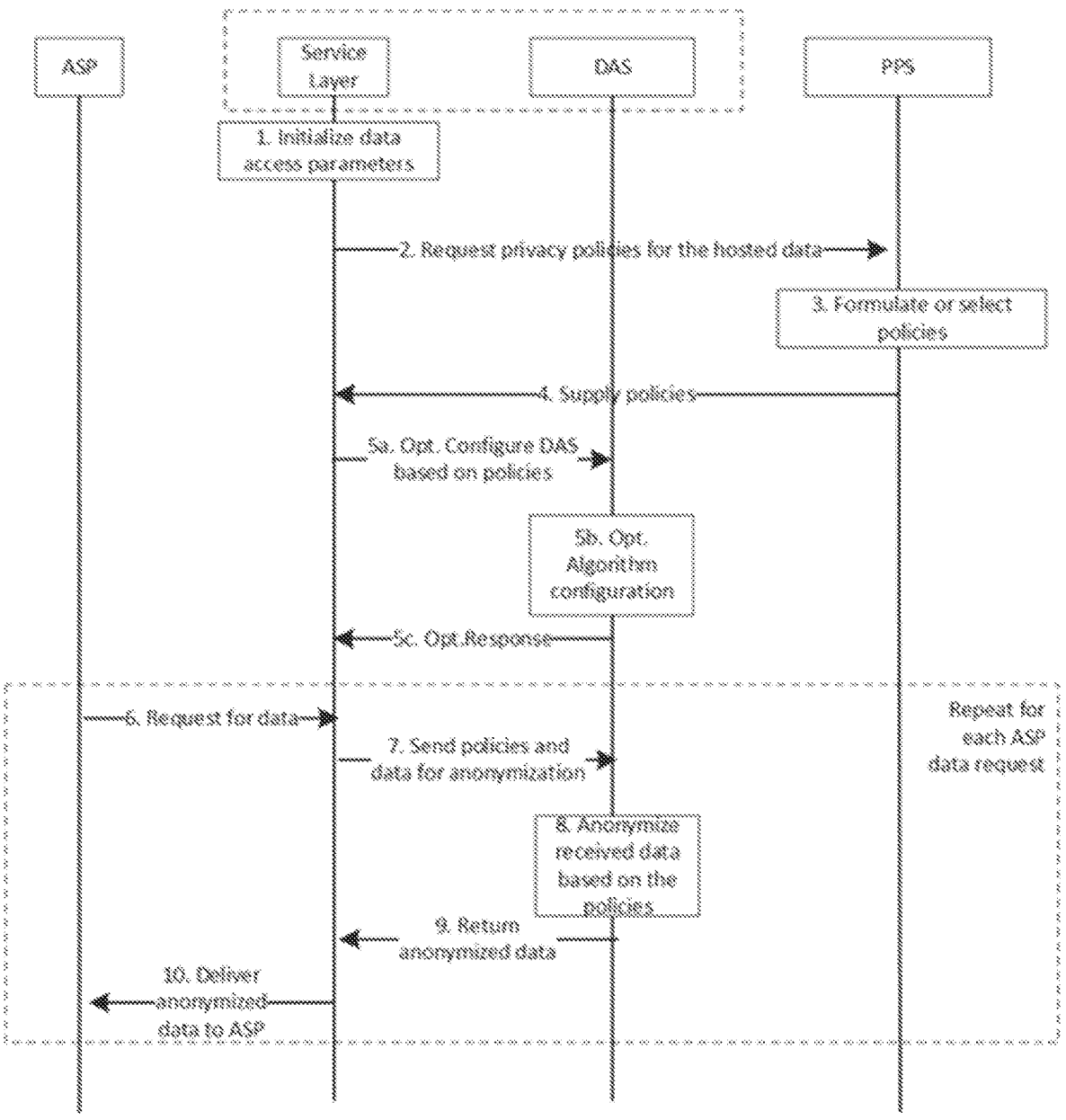
FIG. 17 shows a flow chart of an example method for a data anonymization process with a distributed DAS setting.

FIG. 17 shows a flow chart of an example method for performing data anonymization using a centralized PPS and distributed DAS services, in accordance with the second variant. FIG. 17 depicts an example process by which the Service Layer is provided with information about privacy policies, which may pre-configure DAS services and, when user data is requested by ASPs, the Service Layer may respond with anonymized data utilizing the privacy service. The steps may be described as follows:

At step 1, the service layer (the host of the raw data) initializes its data access. This may be performed as a part of certain procedures such as its own (SL) registration to another SL (e.g., for a device or gateway), when other SLs register to it (e.g., for a gateway or server), when individual resources are created for the first time, etc. At this time, the Access Control Policies for the raw data in question are being set up. Also at this time, the raw data may be associated with one or more User Profiles in the SL.

At step 2, the SL contacts the PPS for privacy policies that may be applied to the hosted data. This step may be performed additionally or alternatively based on other triggers, such as when the SL is informed that new policies have become available, after receiving new policies for related data, to update policies on a regular basis, etc. The SL may also provide associated metadata in the request, such as keywords about the purpose of a resource, the resource creator, etc.

At step 3, the Privacy Policy Service (PPS) creates applicable policies based on request parameters, user preferences and defaults. The government policies and the data consumer preferences may be implemented as defaults. Additionally or alternatively, the policy may indicate choices (e.g., differentiation by data consumer type). The PPS may utilize the user preferences provided in the request or may discover user preferences based on other request parameters. For example, a request for policies associated with a piece of information created by a medical application for user X may trigger the centralized PPS to check if it already has user preferences associated with X and medical data, even if they are not provided by the SL. The policies may include the type of anonymization to be performed, algorithm type, strength, etc. The policy may also specify where and how the anonymized data and the de-anonymization parameters should be stored.

At step 4, the PPS formulates anonymization policies and then sends them to the SL. Note that the same policy might provide differential treatment for requests, for example, by data consumer type, location, time, etc. The PPS may also provide anonymization parameters such as the algorithm to be used (e.g., Mondrian k-anonymity, value of k). Additionally or alternatively, the DDS may derive this information from the policy provided by PPS.

At step 5, the SL may (optionally) perform a pre-configuration of the DAS service for given policy. This may involve initializing the algorithm to be used, registration with the entity providing vault services or anonymized data storage, etc. A response is provided back to SL.

At step 6, an ASP (or originator) requests access to data hosted at the SL which is privacy protected.

At step 7, the SL sends the requested raw data and the applicable policies to the data anonymizer function. If the PPS provided anonymization parameters and DAS has not been pre-configured, this information may also be provided at this time.

At step 8, raw data and applicable policies are received by the data anonymization function as its input. Based on the applicable policies, anonymization parameters are generated (if not provided by the PPS). For example, a different hash strength can be computed for each of the data consumer types included in the policy. Note that some anonymization parameters may be computed by the DAS (e.g., in Step 5b) if the pre-configuration option is used. Based on the data request (with the raw data itself), the anonymization policy and the anonymization parameters, the raw data is anonymized. As a result, an anonymized version of data that meets all the requirements is produced. If de-anonymization data is requested by the policy, it may also be produced by the DAS and stored according to the policy.

At step 9, a response is sent to the SL. The response may include the anonymized data (e.g., if it is specified by the policy). Otherwise, the response may include only the location of the anonymized data. Note that the policy might specify if de-anonymization information should be provided and how it should be stored. If the SL stores de-anonymization information locally, it may be able to perform queries based on anonymous data (e.g. aliases) with the raw data in scope on information which may be available only in the raw data. Alternatively, the de-anonymization information may be received from the DDS and stored in an external secure Vault. Upon receipt of the response, the SL may perform other actions, such as to delete the raw-data, replace it with anonymized data, etc.

At step 10, the anonymized version of the requested data (or its location) is delivered back to the requesting ASP. The reply may include an indication that the data has been anonymized and information about the anonymization techniques applied. The ASP may follow up to this reply with a request for complete access to the data set.

Examples are described below for the implementation of the data anonymization service described herein in a oneM2M embodiment.

The procedure described in connection with FIG. 11 may be adopted for a oneM2M system. For example, the IoT Server may be an IN-CSE and the SMP may be a specialized AE that allows users to make requests to create and modify user profiles. The SMP's interface to the IoT Server may be an Mca interface. Furthermore, the ASP may interface to the IN-CSE and an AE with an Mca reference point.

When a user profile is created, the result may be the creation of a <userProfile> resource. The <userProfile> resource may have a <userPrivacyProfile> child resource. The name of the <userProfile> resource may be set to the Subscriber-ID and the attributes that are associated with the <userProfile> resource may be the same fields that are listed in Table 2.

Creation of the <userProfile> resource may also result in modification of other resources in the IN-CSE. For example, if the create user profile request indicates that the user is linked with particular devices, applications, or service layers, then the corresponding <node>, <AE>, and <remoteCSE> resources may be updated to indicate this link. A new linkedUser attribute may be associated with <node>, <AE>, and <remoteCSE> resources and set equal to any user(s) that are associated with the device, application, or service layer.

TABLE 9

| Child resources of <userProfile > resource type | | | |
| --- | --- | --- | --- |
| Child Resources of <userProfile > | Child Resource Type | Multiplicity | Description |
| [variable] | <userPrivacyProfile> | 0 . . . n | See Table 11. |

TABLE 10

| Attributes of <UserProfile> resource | | | |
| --- | --- | --- | --- |
| Attributes | Multiplicity | RW/RO/WO | Description |
| name | 1 | RW | Name of the user who subscribes to M2M/IoT service layer services |
| Subscriber-ID | 1 | RW | Unique alphanumeric number that represents the user. |
| streetAddress | 0 . . . 1 | RW | Physical address of the user. |
| unitType | 0 . . . 1 | RW | Nature of unit that intuitively defines the accountability as business or person. For example: household, business, corporation etc. |

The <userPrivacyProfile> resource attributes are indicated in the table below:

TABLE 11

| | | | Attributes of <userPrivacyProfile> resource |
|---|---|---|---|
| Attributes | Multiplicity | RW/RO/WO | Description |
| Name | 1 | RW | A description of how the user would like their name to be protected. |
| Street Address | 0 . . . 1 | RW | A description of how the user would like their address to be protected. |
| Associated Identifiers | 0 . . . 1 | RW | A description of how the user would like their associated identifiers to be protected. |
| Allowed third Parties | 0 . . . 1(L) | RW | Third Parties (other entities) that are allowed to consume data related to this user. |
| Restricted third Parties | 0 . . . 1(L) | RW | Third Parties (other entities) that are allowed to consume data related to this user with certain restrictions. |
| Disallowed third Parties | 0 . . . 1(L) | RW | Third Parties (other entities) that are not allowed to consume data related to this user. |
| linkedAE | 0 . . . 1(L) | RW | Optional list of links to <AE>(s) using this profile. |
| linkedNode | 0 . . . 1(L) | RW | Optional list of links to <node>(s) using this profile. |
| linkedCSE | 0 . . . 1(L) | RW | Optional list of links to <CSE>(s) using this profile. |

An example process by which a user profile may be linked with a device, application or a service layer is described herein. Two ways by which a user profile may be linked with device, application or service layer were described above: Profile Linking based on SMP Request and Profile Linking at Device, Application, or Service Layer Registration. Both of these methods may be adopted in a oneM2M system by adding the parameters shown in Table 4 as attributes to the <node>, <AE> or <remoteCSE> resources or by creating a corresponding <devicePrivacyProfile> resource with the attributes corresponding to those in Table 4. At the same time the linkedNode, linkedAE, or linkedCSE attribute to the <userProfile> resource may be updated or populated.

At the same time, the <userProfile> resource may be linked with <m2mServiceSubscriptionProfile>, <serviceSubscribedNode> and <serviceSubscribedAppRule> resources. This relationship may be able to relate a user via a user profile with the service subscriptions the user may have with a <CSEBase> resource that defines the <node> resources and <AE> resources the user authorized to access. Methods for linking a user profile with the device, application or service layer are described below:

(1) Profile Linking based on SMP Request: as discussed herein, an SMP may be a specialized AE. Thus, an AE may request or indicate that a <userPrivacyProfile> be linked with a <node>, <AE> or <remoteCSE> resource. This request may be made by an AE updating a linkedNode, linkedAE, or linkedCSE attribute of the <userPrivacyProfile>. It may also may be made by updating a linkedUser attribute of a <node>, <AE> or <remoteCSE> resource. Additionally or alternatively, the linkedNode, linkedAE, or linkedCSE, and linkedUser attributes may be implemented as sub-resources of their associated resource.

(2) Profile Linking at Device, Application, or Service Layer Registration: A oneM2M CSE can support a process by which a user profile is linked with a device, application or service layer when a service layer registers with an IoT server. When an AE or CSE registers with a CSE, it can indicate which user(s) it should be linked to by providing a linkedUser attribute when it creates it's <AE> or <remoteCSE> resource. Notifications may be sent when a user is linked to an AE, CSE, or node. A CSE or AE may subscribe to any linkedUser attribute in the system being assigned a particular value, may subscribe to an update of a linkedNode, linkedAc, or linkedCSE attribute of a <userProfile> resource, or may subscribe to an update of a linkedUser attribute of a <AE>, <remoteCSE>, or <node> resource.

Figure 18:
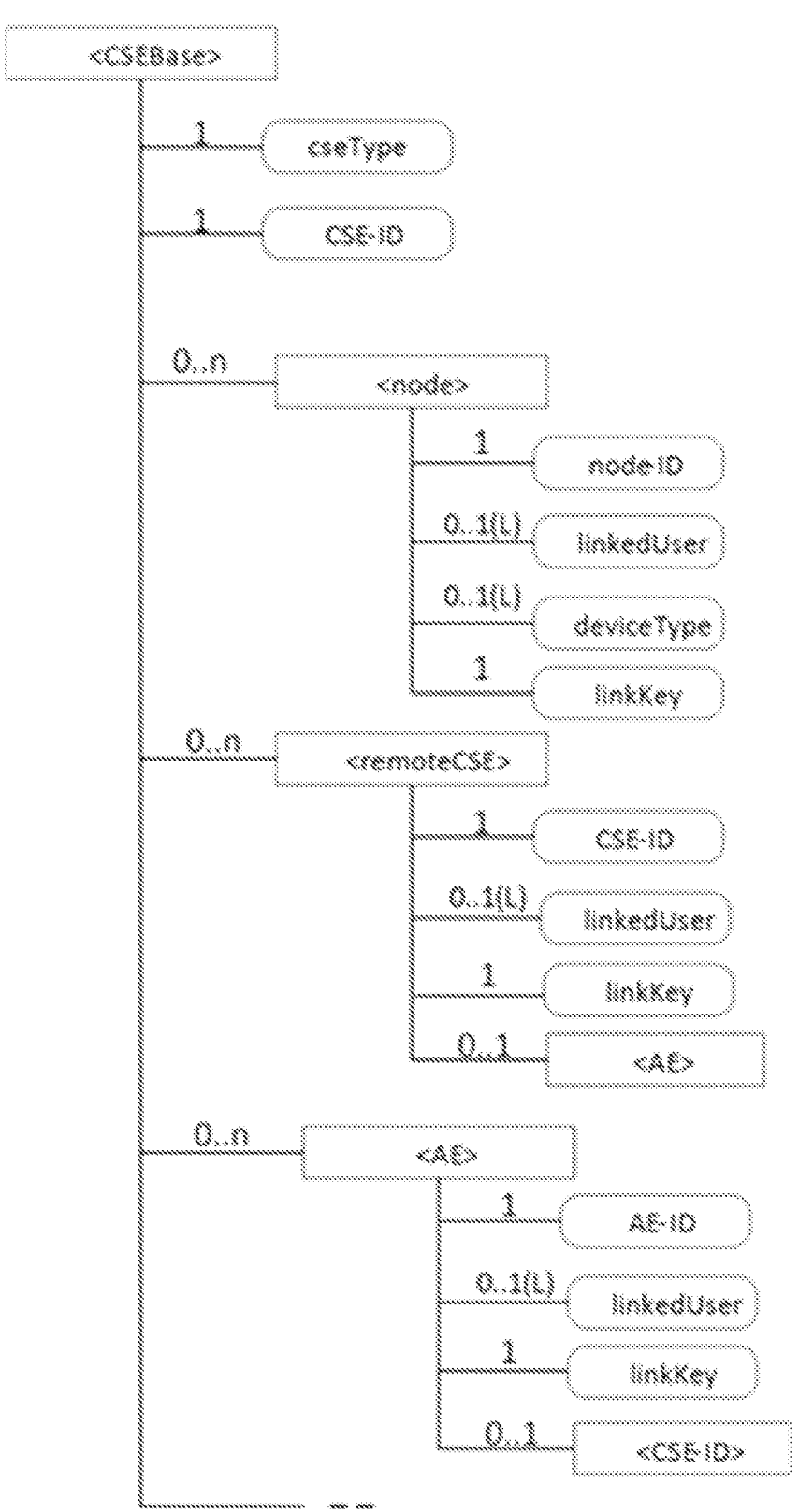
FIG. 18 shows a block diagram of an equivalent representation of a device, application or service layer in a oneM2M resource tree with a linked user.

FIG. 18 shows <node>, <AE> and <remoteCSE> child resources with their corresponding resources and attributes under the main <CSEBase> resource. Each child resource shows the linkedUser attribute attached with it to indicate the linked user profile.

A Privacy Policy Service (PPS) is a service that helps build data privacy policies based on the inputs described above. In a oneM2M Service Layer, this service may be represented either as a separate oneM2M CSF or a Policy Retrieval Point (PRP) that may act as a supplemental function. The PRP is defined in Section 11 of TS-0003. The outputs of a PRP (or a oneM2M CSF with PPS) are privacy policies which can be a <privacyPolicy> resource in a resource tree. Inputs of a PRP (or oneM2M CSF with PPS) are described in Table 5. Outputs of this oneM2M CSF or PRP described in Table 6 may be captured as the <privacyPolicy> resource. The resulting data privacy or anonymization policies are then fed into the Data Anonymization service.

A data anonymization service (DAS) was described above which is responsible for taking raw user data and enforcing data anonymization policies obtained from the PPS (PRP). In oneM2M, a DAS can be a separate oneM2M CSF that serves as a Policy Enforcement Point (PEP) that acts as a supplemental function. This may also act as a Policy Decision Point (PDP) (PDP and PEP are defined in Section 11 of TS-0003) as decisions about whether policies can be enforced may be decided. The output <privacyPolicy> from PPS (PRP) may become the input to DAS (PEP).

The inputs for DAS are described in Table 7. The decision to enforce polices which are output from PRP over user data is made in the DAS. The policies may then be enforced, for example, by applying them into the user data received. Thus, the output from DAS (PEP) is an anonymized version of user data. User data can be represented by a <flexContainer> resource in oneM2M.

Figure 19:
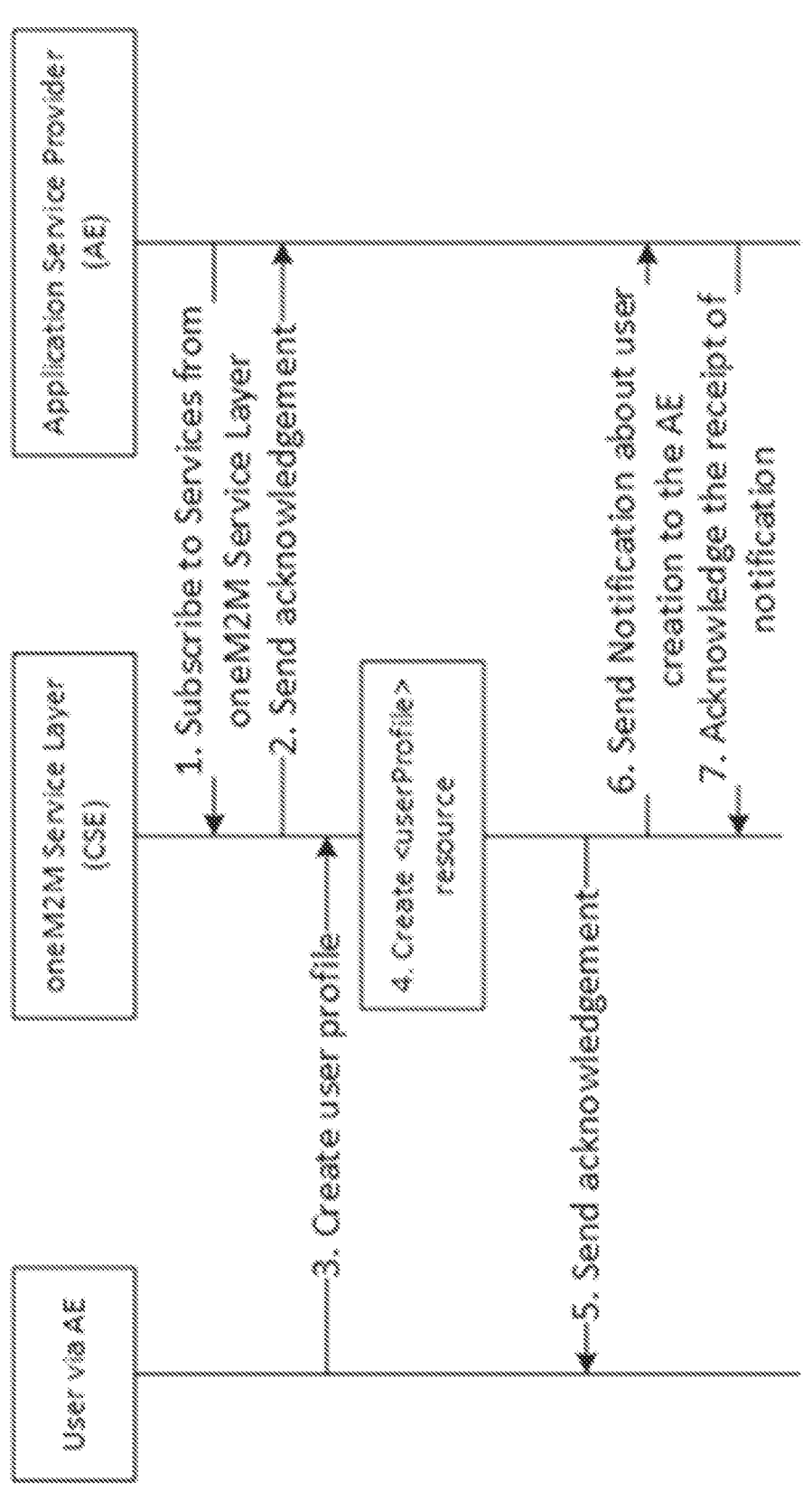
FIG. 19 shows a flow chart of an example method for user profile creation in a oneM2M service layer via an AE.

FIG. 19 shows the steps involved in user profile creation by a user via an SMP in a oneM2M Service Layer.

At step 1, an AE of an ASP may subscribe to different services from a oneM2M service provider. For instance, the subscription may include notification services, device discovery services, or privacy policy management services.

At step 2, an acknowledgement confirms any subscription an AE may have subscribed to.

At step 3, a user may get access to the CSE in a oneM2M system via an interface called Subscriber Management Portal (SMP), which is a specialized AE in a oneM2M Service Layer. To create a user profile, a user may send their credentials in a request. User credentials may include a user's given name and unique identification such as SSN or driver's license number and other information. These pieces of information may be represented as child resources and attributes for the user profile resource to be created.

At step 4, a oneM2M Service Layer creates a <userProfile> resource that incorporates the information of the requesting user. The resource may be created as a child resource of the <CSEBase> resource of the creator CSE. Any additional information that pertains to the user may also be represented as either a child resource of the <userProfile> resource or as attributes of the <userProfile> resource. For example, <userProfile1> may be the main user profile resource and linkedAE and GPSCoordinates may be the attributes of the <userProfile1>.

An alternative example may comprise creating a <userProfile> child resource with a <m2mServiceSubscriptionProfile> resource. This way, a user with a <userProfile> child resource has a subscription with the service layer <CSEBase> resource. The associated <serviceSubscribedNode> resource and <serviceSubscribedAppRule> resource may define the <node> resources and <AE> resources that the user is authorized to access.

At step 5, the oneM2M Service Layer's CSE sends an acknowledgement back to the user via an AE (SMP) notifying of the creation of <userProfile> resource.

At step 6, the oneM2M Service Layer's CSE also sends a notification to the AE (ASP) about the creation of the <userProfile> resource.

At step 7, the AE (ASP) sends an acknowledgement that indicates receipt of notification for creation of the <userProfile> back to oneM2M Service Layer.

Figure 20:
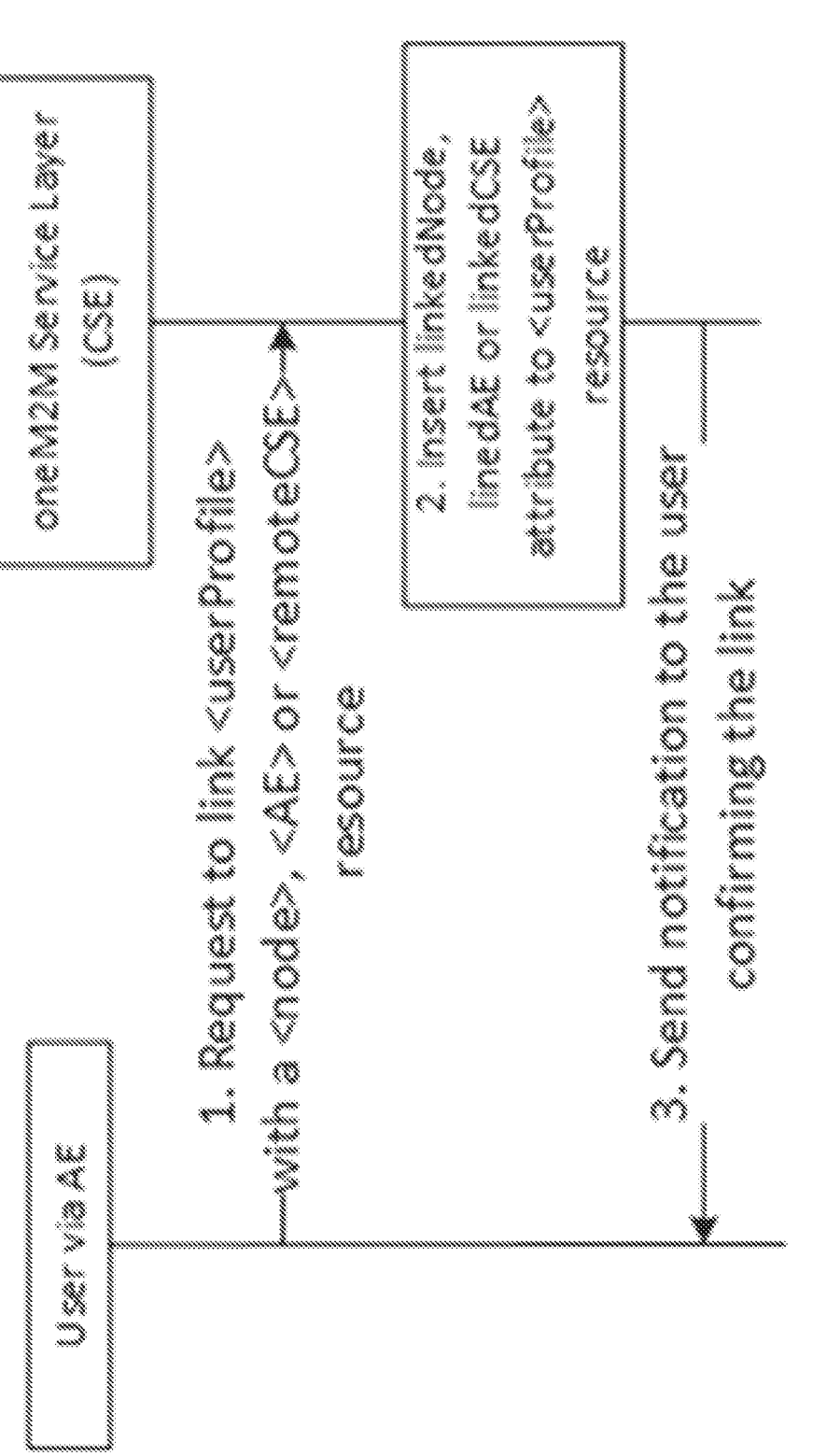
FIG. 20 shows a flow chart of an example method associated with a user request for linking a user profile with a device, application or service layer entity in accordance with a oneM2M embodiment.

Once a user profile has been created, the next step is to link it with an appropriate <node>, <AE> or <remoteCSE>. There are two ways by which a user profile may be linked with a device, application or service layer. FIG. 20 describes the procedure involved in linking a user profile with a <node>, <AE> or <remoteCSE> resource that represents a device, application or service layer, respectively, based on the user request.

At step 1, a user via an AE (SMP) requests to link their user profile, represented by a <userProfile> resource with a <node>, <AE> or <remoteCSE> resource to the CSE in the oneM2M Service Layer. The request may contain the credentials of the device, application or service layer and that of the user.

At step 2, the oneM2M/IoT Service Layer receives the request and processes the request. This may result in service layer CSE updating the <userProfile> resource with linkedNode, linkedAE or linkedCSE attribute that respectively represent the linked device, application or service layer entity. The CSE may also update each of the linked <node>, <AE>, <remoteCSE> resources with an attribute linkedUser to indicate the user linked with the device, application or service layer entity, respectively.

An alternative example may comprise multiple user profile(s) be linked with a <node>, <AE> or a <remoteCSE> resource. This implementation may vary on a case by case basis.

At step 3, the oneM2M/IoT Service Layer sends a notification back to the user via an AE indicating completion of the user to device, application or service layer binding process.

Figure 21:
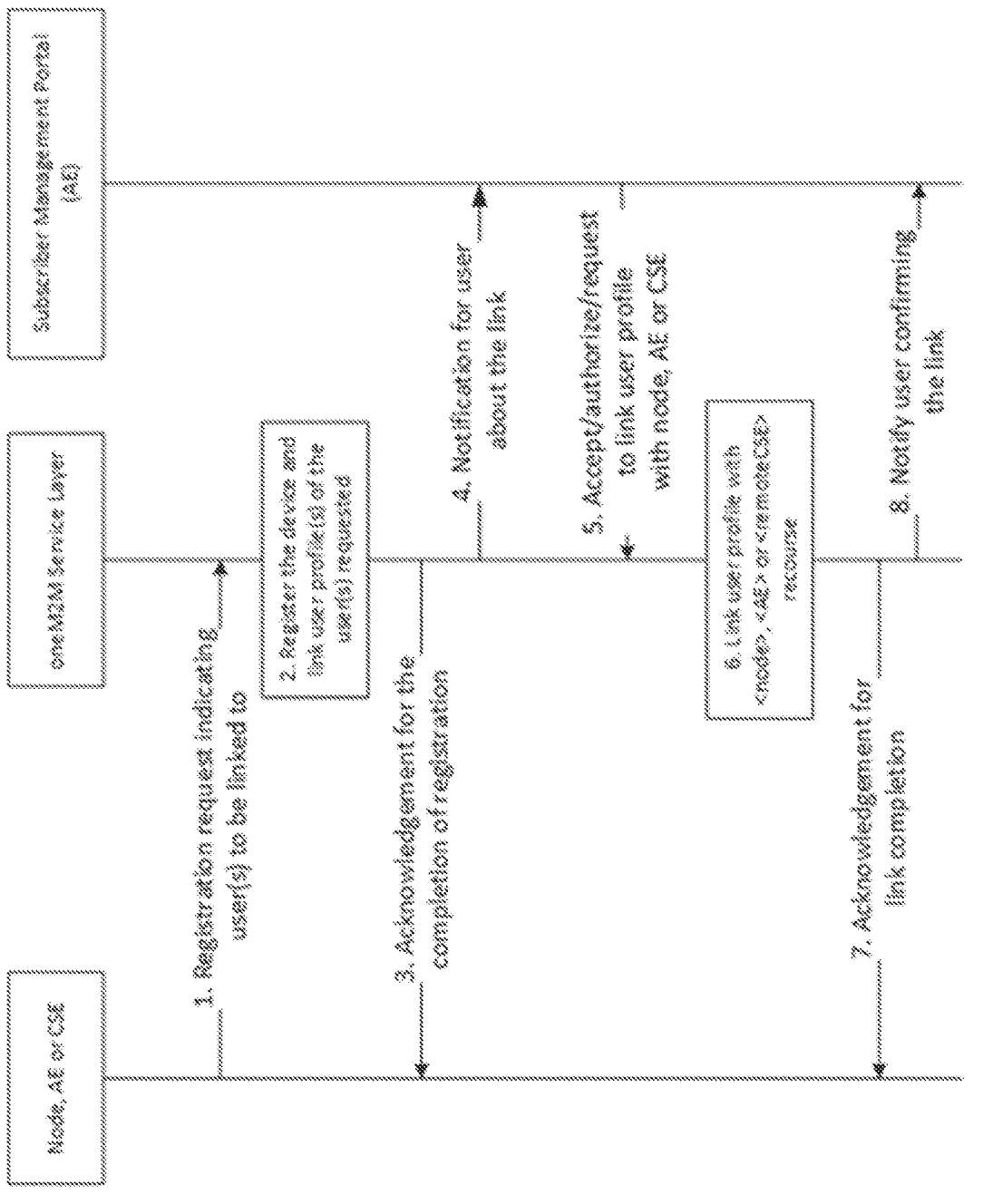
FIG. 21 shows a flow chart of an example method associated with linking a user profile with a node, AE or CSE based on a registration request from a node, AE or CSE in accordance with a oneM2M embodiment.

A second method by which a user profile is linked with a device, application or service layer is based on the registration request from a device, application or service layer that includes the user(s) that need to be linked with it. FIG. 21 describes how a node, AE or an CSE in a oneM2M system can make that request.

At step 1, a node, AE or CSE sends registration request to the IoT server including the user(s) with whom the node, AE or CSE is desired to be linked. The request may include a link key.

At step 2, the oneM2M Service Layer registers the requesting node, AE or CSE. In addition, the user profile(s) of the user(s) indicated in the request may be linked with the requesting and registered node, AE or CSE. The oneM2M Service layer also checks that the link key that was provided in step 1 matches the link key in the record of the user that the requestor wants to link to. This may result in populating or updating the record or resource representation of the linked node, AE or CSE and the record or resource representation of the user to indicate the link or association. In FIG. 18, the linked user profile of a user is depicted as a linkedUser attribute of the <node>, <AE> and <CSE> resource.

At step 3, an acknowledgement is sent back to the requesting node, AE or CSE about the success or failure of the registration and linking process with the user(s) indicated.

At step 4, the oneM2M Service Layer sends a notification via an AE (that represents the SMP) about the link-request made by the node, AE or CSE. The notification may be forwarded to the user.

At step 5, user(s) may accept or authorize the oneM2M Service Layer, or may send a request to link the user profile with the requesting node, AE or CSE.

At step 6, upon the consent of the user, the oneM2M system completes the linking process of user profile(s) with the requesting node, AE or CSE. This may result in populating or updating record or resource representation of the user(s) to indicate the link or association.

At step 7, the oneM2M Service Layer sends an acknowledgement back to the requester node, AE or CSE about completion of the link between the user(s) and the node, AE or CSE.

At step 8, the oneM2M Service Layer sends a notification to the user(s) via AE about the completion of the link between user profile(s) of the user(s) and the requesting node, AE or CSE.

The process involved in data anonymization, as described above, includes a description on how entities involved in the process relate to the entities in the oneM2M domain. FIG. 15 describes an example call flow for the method involved while processing a data request by a third party to an IoT Server while utilizing the PPS and DAS to provide a privatized (anonymized) version of user data. This procedure can be adopted in the oneM2M system. Any Application Service Provider (ASP) can be an AE that allows third party entities to send a request for user data. The request for data message can be a RESTful RETRIEVE operation sent via an Mca interface. The IoT server can be an IN-CSE, MN-CSE or ASN-CSE depending upon where a system server resides or the nature of implementation. As described herein, a Privacy Policy Service (PPS) can act as a oneM2M CSF or PRP. The Data Anonymization Service (DAS) can be a oneM2M CSF or PEP/PDP in a oneM2M system.

Figure 22:
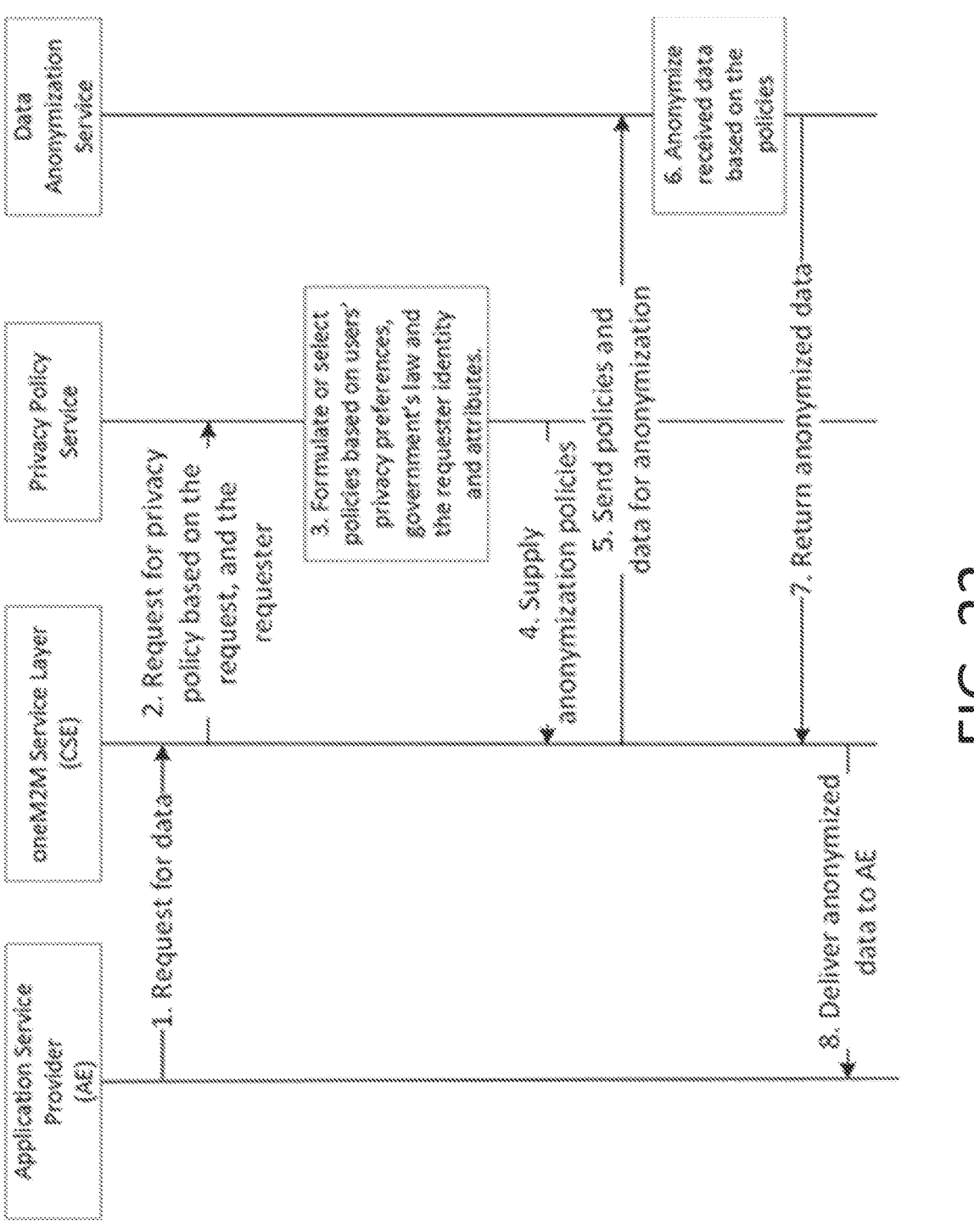
FIG. 22 shows a flow chart of an example method for a data request and anonymized data delivery in a oneM2M system.

FIG. 22 depicts a call flow diagram for the data anonymization procedure in a oneM2M/IoT system. The figure assumes that a <userProfile> resource has been created, and that a <node>, <AE> or <CSE> resource has been linked to the <userProfile> resource.

> At step 1, an AE that represents an ASP may send a RESTful read request to a oneM2M system via an Mca interface. As the request is received by the oneM2M system, the request for user data is identified. The data request may comprise the requesting party's preference, which may be based on the data category, range of dates, location and so on.
>
> At step 2, as the oneM2M system identifies the request from an AE, the CSE asks for data anonymization policies applicable to the request received from the AE.
>
> At step 3, upon receiving the request from the CSE, the PPS, which acts as a PRP, retrieves the government legal requirements/policies, user preferences and data consumer preferences from their respective databases. These requirements may be residing in separate databases or may be residing in a single database. Based on these requirements, the PPS formulates policies applicable for data anonymization.
>
> At step 4, the PPS forwards the formulated anonymization policies to the CSE.
>
> At step 5, the CSE supplies user data and policies to the Data Anonymization Service (DAS).
>
> At step 6, the DAS acts as a PEP/PDP in the oneM2M system. Anonymization policies are applied over the raw user data. Thus, an anonymized/privatized version of user data is produced.
>
> At step 7, the DAS forwards the anonymized version of data back to the CSE.
>
> At step 8, the CSE sends the anonymized version of user data to its requesting AE via a RESTful communication. Note that the reply may include an indication that the data has been anonymized. Furthermore, the reply may indicate what anonymization techniques were applied to the data. The AE may follow up to this reply with a request for complete access to the data set.

In one example, the PPS and the DAS may be deployed at the network edge, for example in a Gateway (or an MN-CSE in a oneM2M example). This is useful when considering the scenario where a homeowner has numerous IoT devices/sensors deployed throughout his home and the devices store data on a gateway which is also deployed in his home.

In the Network Edge deployment scenario, the GW owner may configure the GW with polices related to how data should be anonymized and what data may be exposed to interested third parties.

Furthermore, the GW may be configured with alias polices that may be used to give consistent aliases to various users, devices, and data sets that may be found within the home. Consistent aliasing is important in a scenario where a data consumer reads data about a device once a week. Each time the consumer obtains data, it may be necessary for the consumer to correlate its readings with the readings that were obtained a week before. This type of deployment may use the procedural flow described above in connection with the Distributed Data Anonymization service.

In an example oneM2M embodiment, a user may have number of devices (e.g., a smart watch, health monitoring devices, smart applications) that register with a gateway in his home. The devices may be ADN-AE's and the gateway may be an MN-CSE. The ADN-AE's may register with the MN-CSE. The MN-CSE (gateway) may register with an IN-CSE that is owned by a oneM2M service provider.

The IN-CSE may connect to a IN-AE that allows user-profiles to be created in its resource tree. The IN-AE may be used to create a new user-profile. Creating a new user profile may entail creating a <userProfile> resource. The user profile may include a <userPrivacyProfile> sub-resource. The <userPrivacyProfile> sub-resource may a list of what third parties (IN-AE's) are permitted to access data that is associated with the user. Furthermore, the <userPrivacyProfile> sub-resource may further describe how requests from each third party (IN-AE) should be treated. For example, it may specify that one IN-AE is an Allowed Third Party and can see all data and that another IN-AE is a Restricted Third Party. The policy may further describe how to restrict data access (e.g., whether the IN-AE can only see certain types of data or should not be allowed to see certain types of data). The policies may be specified in the sub-resources or attributes of the <userPrivacyProfile> as described herein.

One of the AND-AE's may be a smart watch that tracks the owner's heart rate and exercise activity. The values may be stored on the gateway and announced to the IN-CSE.

One of the third party IN-AE's may be a health monitoring application that allows the owner of the smart watch to view his activity summary. This IN-AE may request to read the data as shown in FIG. 16, where the IN-AE is the ASP. The IN-CSE may be the IoT Server, and the Privacy Policy Service and Data Anonymization Services may be CSF's. In step 2, when the IN-CSE invokes the Privacy Policy Service, the policies in the <userPrivacyProfile> may be provided to the Privacy Policy Service and used to determine that the health monitoring system is permitted to see all of the owner's data. The policy that is generated by the Privacy Policy Service and provided in step 4 indicates that the IN-AE can access all of the user's data. In step 5, the policy may be provided to the Data Anonymization service along with the announced data. In step 7, the Data Anonymization service may provide the IN-CSE with a data set that represents all of the user's activity. This data is then provided to the IN-AE.

Another of the third party IN-AE's may be a health insurance application that is able to view the owner's exercise activity so that he can obtain discounts on his premium. However, the owner may wish to prevent or restrict the health insurance company from viewing more details of his activity (e.g., heart rate). This IN-AE may request to read the data as shown in FIG. 16, where the IN-AE is the ASP. The IN-CSE may be the IoT Server, and the Privacy Policy Service and Data Anonymization Services may be CSF's. In step 2, when the IN-CSE invokes the Privacy Policy Service, the policies in the <userPrivacyProfile> may be provided to the Privacy Policy Service and used to determine that the health insurance company is permitted to see only the owner's exercise time, but not other health measurements. The policy that is generated by the Privacy Policy Service and provided in step 4 indicates that the IN-AE is permitted to see only the owner's exercise time, but not other health measurements. In step 5, the policy may be provided to the Data Anonymization service along with the announced data. In step 7, the Data Anonymization service may provide the IN-CSE with a data set that only includes the owner's exercise times. This data is then provided to the IN-AE.

Figure 23:
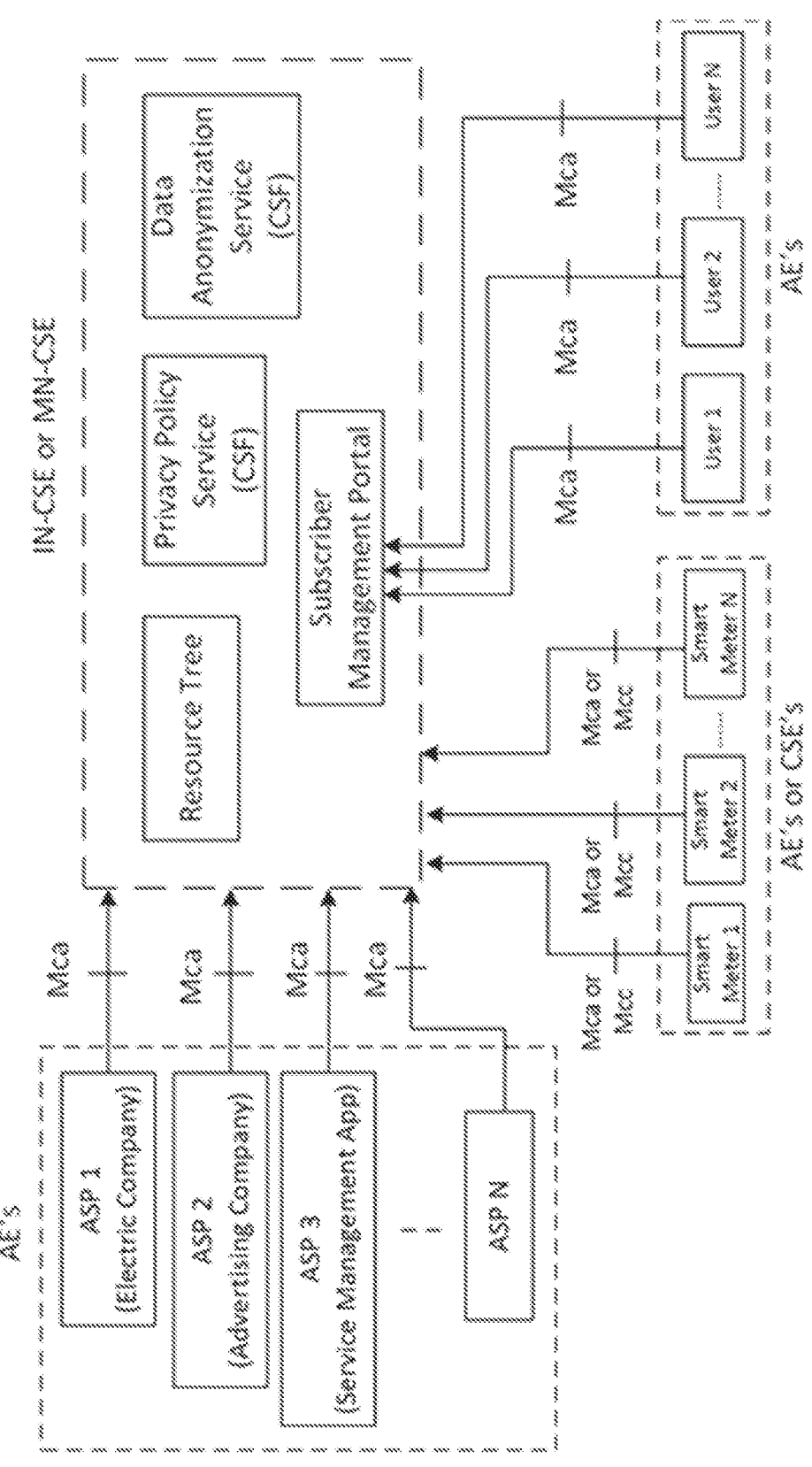
FIG. 23 shows an example block diagram of PPS and DAS services in a service layer.

FIG. 23 shows a oneM2M/IoT specific implementation of the example shown in FIG. 11. FIG. 23 shows that PPS and DDS can reside at either am infrastructure node or a middle-node service layer. Several ASP's may have their individual applications represented as AE's which connect to the IN-CSE or MN-CSE via an Mca. Devices (e.g., smart meters) may act as an AE or CSE and may connect to the IN-CSE or MN-CSE via an Mca or Mcc, respectively. Users may connect to the IN-CSE or MS-CSE via Mca's through a special application called a Subscriber Management Portal using applications shown as AE's. The PPS and the DAS may reside as oneM2M/IoT Common Service Functions in this implementation.

In an example 3GPP Embodiment, in a 3GPP 5G Core Network, an NWDA Network Function may collect data about performance of the network, specific network slices, specific network functions, specific users, specific devices, and/or specific subscribers (also user, subscriber, and device types). This data may be exposed to third party application functions (AF's) via a direct interface with the AF. Additionally or alternatively, the AF may make its requests via an NEF.

As described above, the data that is exposed to the third party AF may need to be anonymized. The Privacy Policy Service and Data Anonymization Service may be deployed as virtualized Network Functions in a 3GPP 5G Core Network and used to assist with sanitizing data before it is exposed to third party Application Functions.

The Privacy Policy Service may be deployed as a new standalone NF or the PPS functionality may be integrated with an existing NF such as the NWDA, PCF, or NEF. The PPS may store policies related to how data should be anonymized the UDR. In order to properly formulate polices, the PPS may obtain network, user, subscriber, and third party application preferences from the UDR. When the PPS accesses the UDR, it may be a direct access or via the UDM.

Figure 24:
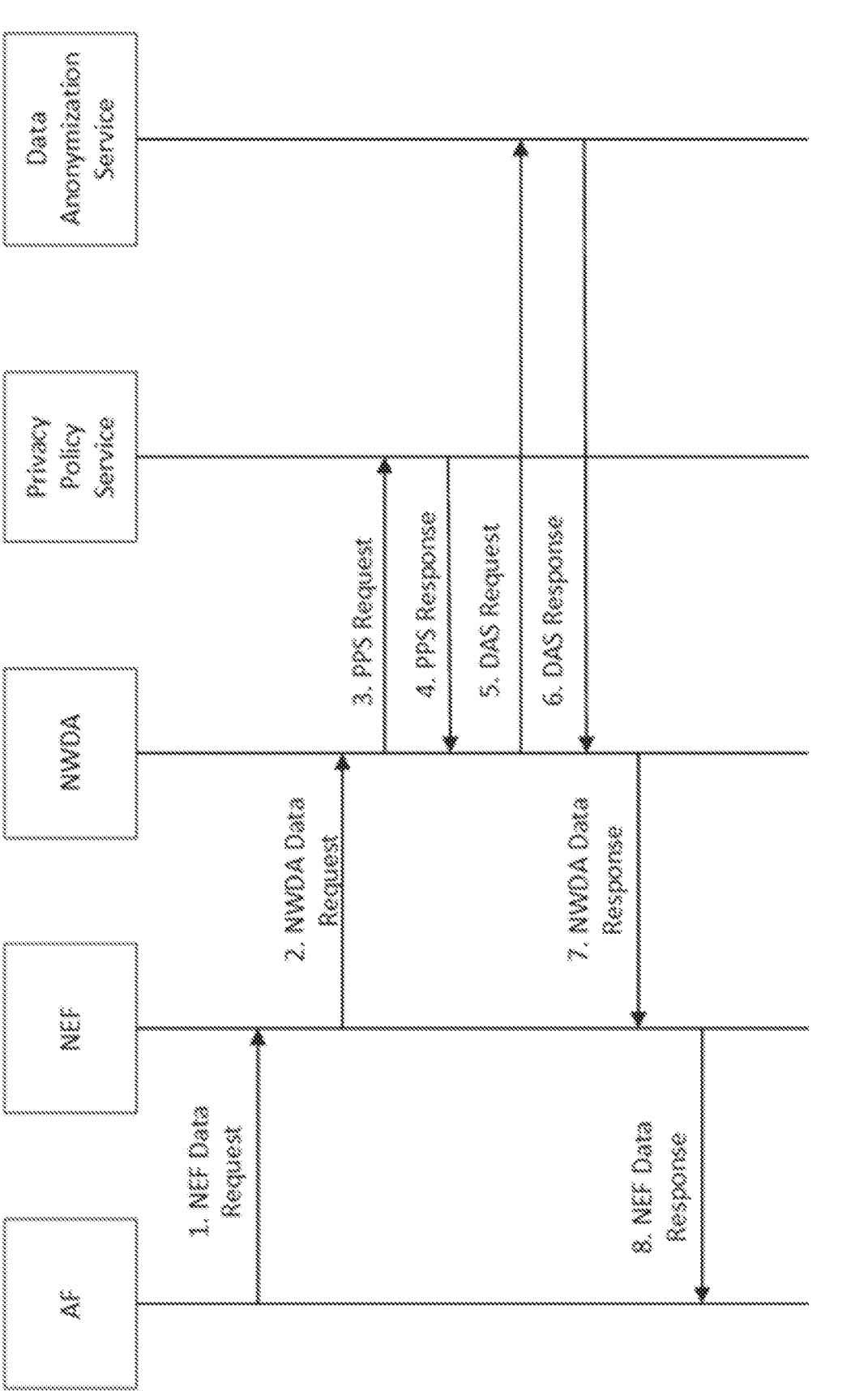
FIG. 24 shows an example method of a third party AF requesting data in a 3GPP system.

The Data Anonymization Service (DAS) may be deployed as a new standalone NF or the PPS functionality may be integrated with an existing NF such as the NWDA, PCF, or NEF. In order to properly anonymize data, the DAS may obtain privacy policies from the PPS or UDR. Additionally or alternatively, they may be provided to the DAS in data anonymization requests. When the PPS access the UDR, it may be a direct access or via the UDM. Note that the PPS and DAS functionality may be integrated in a single NF. Example details are shown in FIG. 24 and described below:

At step 1, the third party Application Function sends a request to the NWDA for a set of data by invoking a read data service. The request may be made by directly addressing the NWDA or it may be made via the NEF. At a minimum, this request indicates what data set the AF is requesting. This may be done by indicating a data set identifier. The request may further indicate that the AF desires data that pertains to individual or groups of users, subscribers, devices, or networks. The request may also include an authorization key that can be verified/authorized by the network to check that the AF is authorized to obtain the requested data.

At step 2, the NEF forwards the data request to the NWDA and the AF identifier. The NEF may first authorize the request from the AF by querying the UDM/UDRM to check if the AF is authorized to consume the data. The UDM/UDR query may further verify if the provided authorization key is correct.

At step 3, the NWDA may provide the PPS with an indication of what data set is requested, who is requesting the data (AF Identifier), and the user(s), subscriber(s), and device(s) that are associated with the data. The PPS may obtain polices or preferences related to the user(s), subscriber(s), and device(s) that are associated with the data. For example, the PPS may obtain such polices and preferences from the UDM/UDR. The PPS may then formulate a policy that describes how the requested should be anonymized.

At step 4, the PPS replies to the NWDA with a policy as described herein. The policy may include the identity of a DAS that is capable of accessing the data set and capable of applying the policy over the data set. Note that the PPS may have stored the policy in a storage function such as the UDR, in which case the PPS may simply provide the NWDA with an identifier, or pointer, to the policy.

At step 5, the NWDA sends a request to the DAS to request that the data be anonymized. The request may include the data and policy or pointers to the data and policy.

At step 6, the DAS may apply the policies to the data set as described herein and provide the anonymized data to the NWDA. If the request of the previous step included a pointer to the data and/or policy, then the DAS may need to retrieve the data and/or policy from the appropriate storage function before applying the policy to the data.

At step 7, the NWDA replies to the AF with the requested data set (which has been anonymized). This reply may be routed to the AF via the NEF.

At step 8, the NEF replies to the AF.

Requests from the AF to NEF may also indicate that the AF would like certain devices, subscribers, or users to insert metadata in their traffic towards the network so that NF's such as the AMF, SMF, and UPF may collect the metadata and forward it to the NWDA. The NEF may forward such a request to the PCF. The PCF may then send updated USRPs to the UE that indicate that the UE should send metadata to the network. Once analytic data from the UE is stored in the NWDA, the procedure of FIG. 24 may be used to anonymize data before forwarding the data to the third party application server.

A service layer entity may be configured to receive from an application service provider a request to access data associated with a particular user of the service layer entity, determine based on the request to access the data that one or more privacy policies are associated with the particular user, retrieve the one or more privacy policies, generate based on the one or more privacy policies an anonymized data set that prevents the application service provider from determining one or more identifying characteristics of the particular user, and send to the application service provider the anonymized data set.

Generating the anonymized data set may comprise one or more of removing at least a portion of the data and modifying at least a portion of the data. Modifying at least a portion of the data may comprise one or more of abbreviating at least a portion of the data, substituting at least a portion of the data, shuffling at least a portion of the data, and encrypting at least a portion of the data. The one or more privacy policies may comprise one or more user policies associated with the particular user, one or more application service provider policies, and one or more legal policies. The request to access the data associated with the particular user may comprise one or more characteristics associated with the application service provider. Sending the anonymized data set may comprise sending, to the application service provider, at least one of an indication that the data has been anonymized and an indication of the anonymization techniques used to anonymize the data. The service layer entity may further be configured to select, based at least on the one or more characteristics associated with the application service provider, one or more of a plurality of privacy policies associated with the particular user.

A service layer entity may be configured to initialize one or more data access parameters, retrieve one or more privacy policies from a privacy policy service, store the one or more privacy policies at the service layer entity, receive from an application service provider a request to access at least a portion of data stored at the service layer entity, determine that one or more of the stored privacy policies are applicable to the portion of the data, anonymize based on the one or more privacy policies the portion of the data to prevent the application service provider from determining one or more identifying characteristics of a particular user associated with the portion of the data, and send to the application service provider the anonymized data.

Anonymizing the data may comprise one or more of removing at least a portion of the data and modifying at least a portion of the data. Modifying at least a portion of the data may comprise one or more of abbreviating at least a portion of the data, substituting at least a portion of the data, shuffling at least a portion of the data, and encrypting at least a portion of the data. The one or more privacy policies may comprise one or more user policies associated with the particular user, one or more application service provider policies, and one or more legal policies. The one or more access parameters may be initialized as part of a service layer registration procedure. The request to access the portion of the data may comprise one or more characteristics associated with the application service provider. Sending the anonymized data may comprise sending, to the application service provider, at least one of an indication that the data has been anonymized and an indication of the anonymization techniques used to anonymize the data. The service layer entity may further be configured to select, based at least on the one or more characteristics associated with the application service provider, a given one of the privacy policies stored at the service layer entity.

A service layer entity may be configured to receive from a device a link request comprising an indication to link the device with one or more user profiles, register the device to the service layer entity, send to a subscriber management portal a notification based on the link request, receive from the subscriber management portal an indication that a user associated with one or more of the user profiles has accepted the link request, and link at the service layer entity the device and the one or more user profiles.

The link request may comprise a key. The service layer entity may be configured to determine that the link key received from the device matches a link key associated with the user profile. The service layer entity may be configured to send, to at least one of the device or the subscriber management portal, an indication that the device and the one or more user profiles have been linked. The device may be one of a user device, an application, or another service layer entity.

Figure 25A:
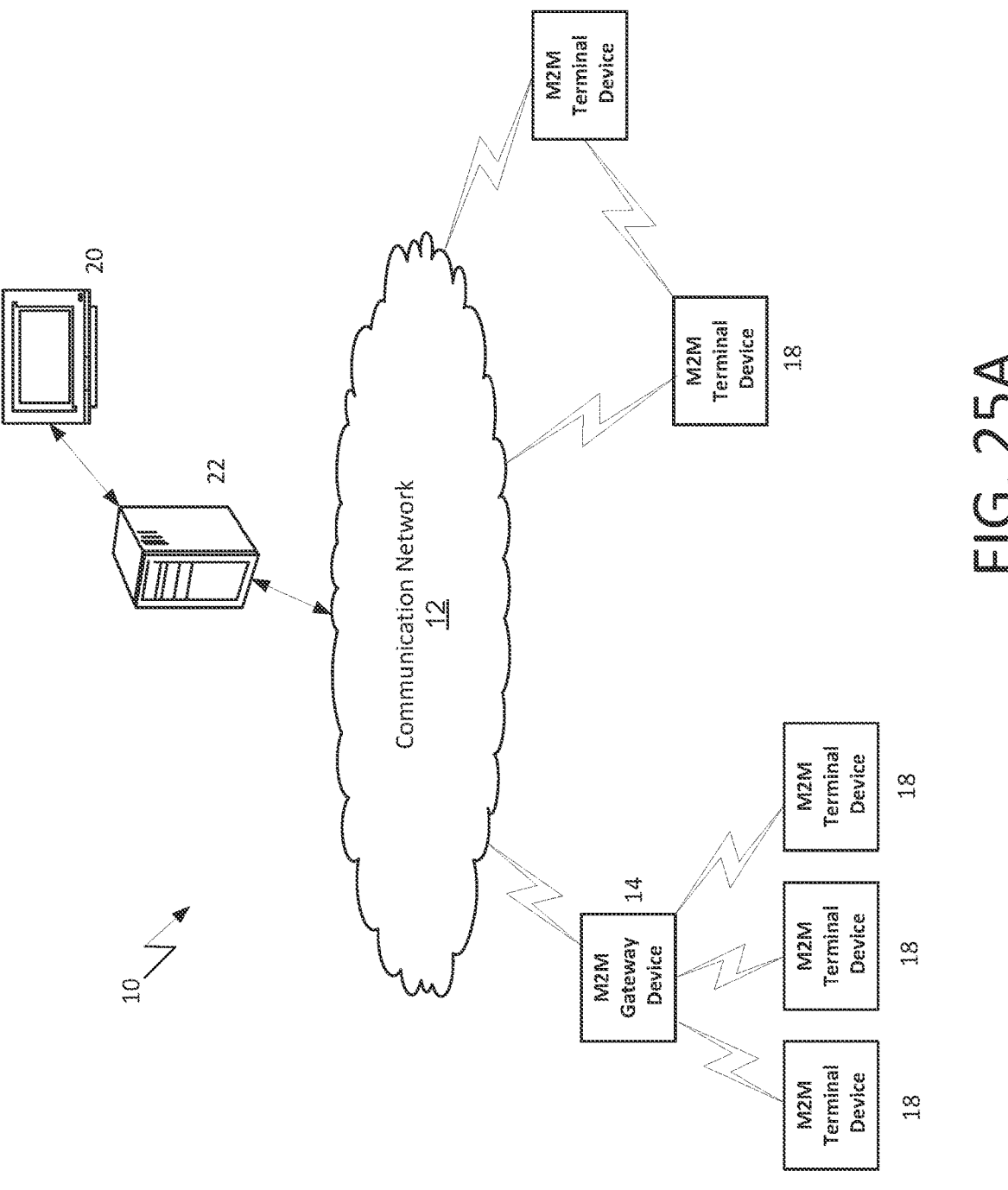
FIG. 25A shows an example system diagram of an example machine-to-machine (M2M) or Internet of Things (IoT) communication system in which one or more disclosed embodiments may be implemented.
Figure 25B:
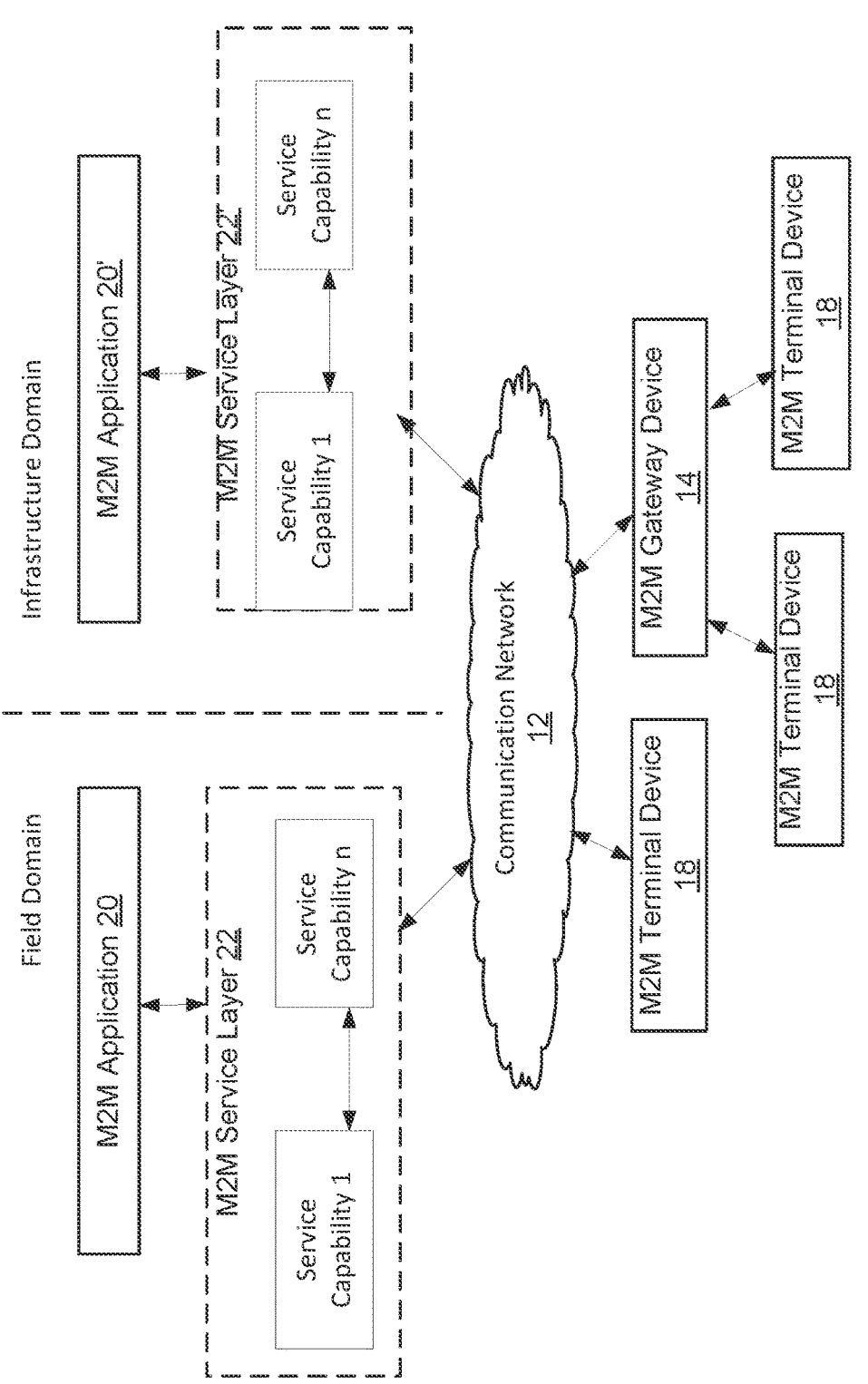
FIG. 25B shows an example system diagram of an example architecture that may be used within the M2M/IoT communications system illustrated in FIG. 25A.
Figure 25C:
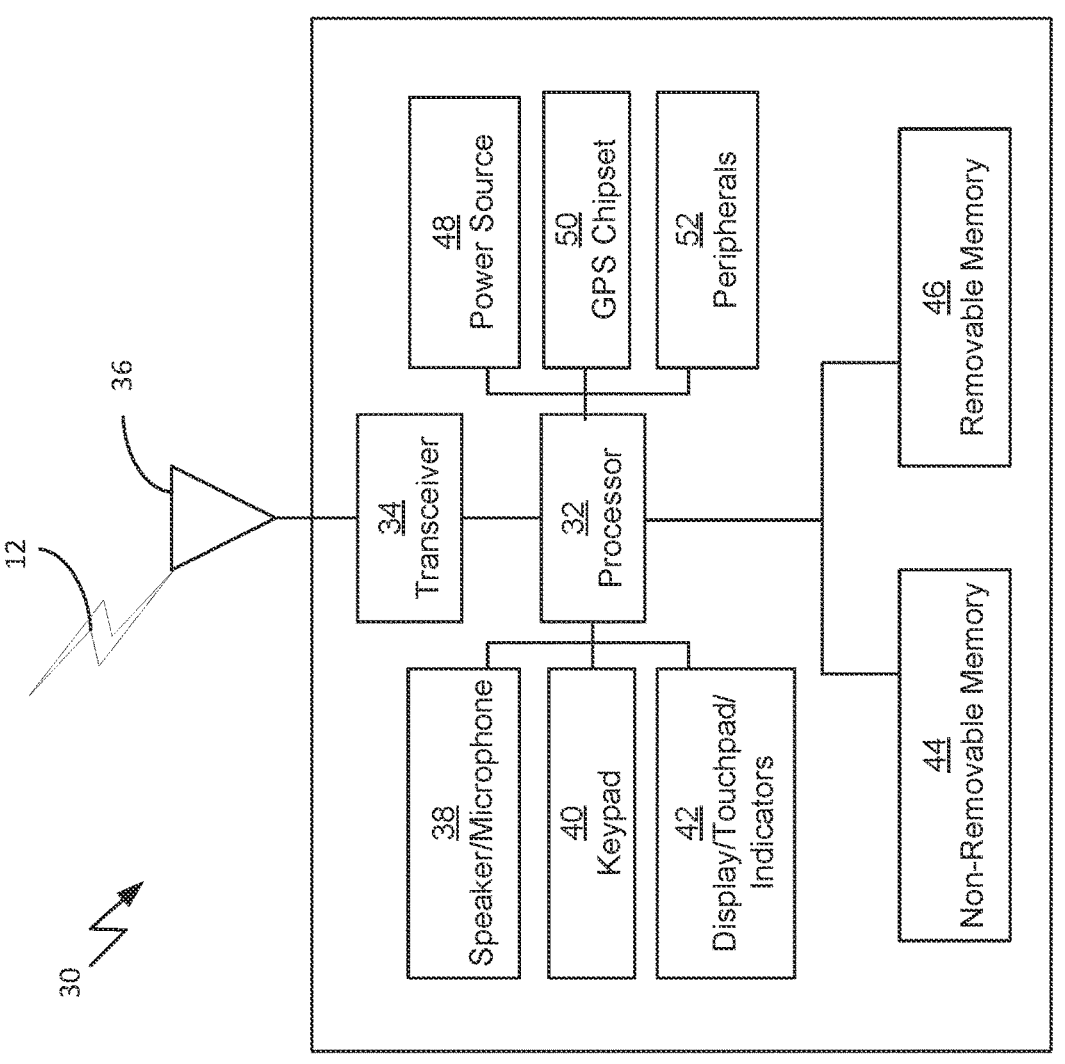
FIG. 25C shows an example system diagram of an example M2M/IoT terminal or gateway device that may be used within the communications system illustrated in FIG. 25A.
Figure 25D:
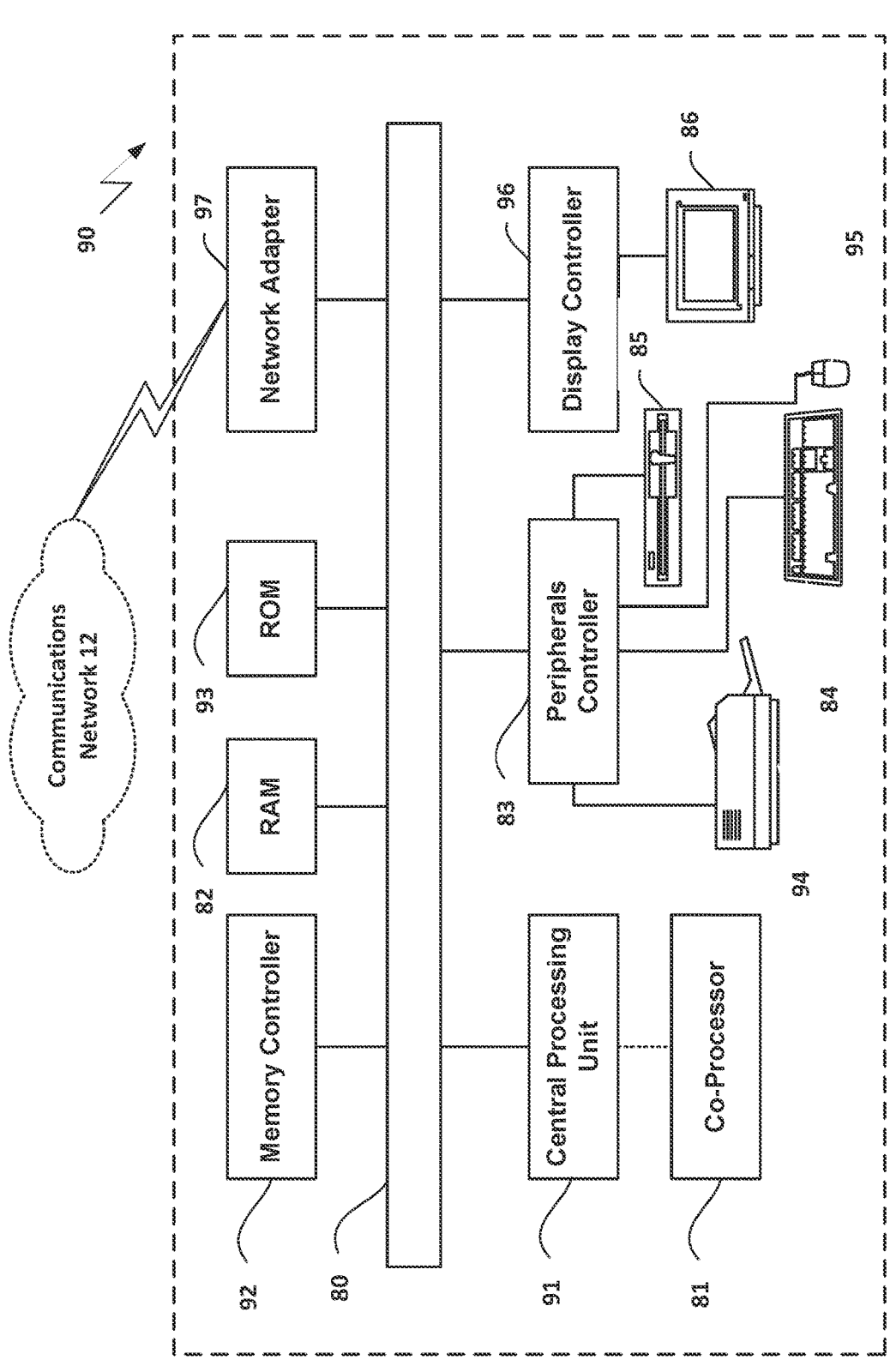
FIG. 25D shows an example block diagram of an example computing system in which aspects of the communication system of FIG. 25A may be embodied.

Any of the entities performing the steps illustrated in FIGS. 5, 6, 9-17 and 19-24, such as the service layer, service layer device, service layer application, application entity, and the like, may be logical entities that may be implemented in the form of software (i.e., computer-executable instructions) stored in a memory of, and executing on a processor of, an apparatus configured for wireless and/or network communications or a computer system such as those illustrated in FIG. 25C or FIG. 25D. That is, the method(s) illustrated in FIGS. 5, 6, 9-17 and 19-24 may be implemented in the form of software (i.e., computer-executable instructions) stored in a memory of an apparatus, such as the apparatus or computer system illustrated in FIG. 25C or FIG. 25D, which computer executable instructions, when executed by a processor of the apparatus, perform the steps illustrated in FIGS. 5, 6, 9-17 and 19-24. It is also understood that any transmitting and receiving steps illustrated in FIGS. 5, 6, 9-17 and 19-24 may be performed by communication circuitry of the apparatus/entity under control of the processor of the apparatus and the computer-executable instructions (e.g., software) that it executes.

FIG. 25A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or apparatus of the IoT/WoT as well as an IoT/WoT Service Layer, etc. Any of the entities illustrated in any of FIGS. 1-24 may comprise a network apparatus of a communication system, such as the ones illustrated in FIGS. 25A-25D.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications and/or various devices with access to a collection of or a set of the above-mentioned capabilities or functionalities, supported by the service layer, which may be referred to as a CSE or SCL. A few examples include but are not limited to security, charging, data management, device management, discovery, provisioning, and connectivity management which may be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 25A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 25A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network apparatuses (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link.

A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbec, 6LoWPAN, Bluetooth), direct radio link, and wireline for example. Example M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 25B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more network apparatuses of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more network apparatuses of the network, which may comprise servers, computers, devices, virtual machines (e.g., cloud computing/storage farms, etc.) or the like.

Referring also to FIG. 25B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other network apparatuses of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 25B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network apparatus (e.g., server, computer, gateway, device or the like) having the general architecture illustrated in FIG. 25C or FIG. 25D described below.

Further, the methods and functionalities described herein may be implemented as part of an M2M network that uses a Service Oriented Architecture (SOA) and/or a Resource-Oriented Architecture (ROA) to access services.

From a deployment perspective, a service layer can be deployed on various types of network nodes including servers, gateways and devices as shown in the various figures herein. Any such node, server, gateway, device, apparatus, or other logical entity of a communications network that implements service layer functionality or otherwise incorporates an instance of a service layer may be referred to herein as a service layer entity.

FIG. 25C is a block diagram of an example hardware/software architecture of an apparatus of a network, such as one of the entities illustrated in FIGS. 1-24, which may operate as an M2M server, gateway, device, or other network apparatus in an M2M network such as that illustrated in FIGS. 25A and 25B. As shown in FIG. 25D, the network apparatus 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The network apparatus 30 may also include communication circuitry, such as a transceiver 34 and a transmit/receive element 36. It will be appreciated that the network apparatus 30 may include any sub-combination of the foregoing elements while remaining consistent with an embodiment. This network apparatus may be an apparatus that implements the methods for data anonymization described herein, such as the operations illustrated and described in relation to FIGS. 5, 6, 9-17 and 19-24.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the network apparatus in order to perform the various required functions of the network apparatus. For example, the processor 32 may perform signal coding, data processing, power control, input/output processing, and/or any other functionality that enables the network apparatus 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 25C, the processor 32 is coupled to its communication circuitry (e.g., transceiver 34 and transmit/receive element 36). The processor 32, through the execution of computer executable instructions, may control the communication circuitry in order to cause the network apparatus 30 to communicate with other network apparatuses via the network to which it is connected. In particular, the processor 32 may control the communication circuitry in order to perform the transmitting and receiving steps described herein (e.g., in FIGS. 5, 6, 9-17 and 19-24) and in the claims. While FIG. 25C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other network apparatuses, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 25C as a single element, the network apparatus 30 may include any number of transmit/receive elements 36. More specifically, the network apparatus 30 may employ MIMO technology. Thus, in an embodiment, the network apparatus 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the network apparatus 30 may have multi-mode capabilities. Thus, the transceiver 34 may include multiple transceivers for enabling the network apparatus 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the network apparatus 30, such as on a server or a home computer. The processor 32 may be configured to control lighting patterns, images, or colors on the display or indicators 42 to reflect the status of an apparatus or configure an apparatus, and in particular underlying networks, applications, or other services in communication with the network apparatus. In one embodiment, the display/indicators 42 may present a graphical user interface.

The processor 32 may receive power from the power source 48, and may be configured to distribute and/or control the power to the other components in the network apparatus 30. The power source 48 may be any suitable device for powering the network apparatus 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the network apparatus 30. It will be appreciated that the network apparatus 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The network apparatus 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The network apparatus 30 may connect to other components, modules, or systems of such apparatuses or devices via one or more interconnect interfaces, such as an interconnect interface that may comprise one of the peripherals 52.

FIG. 25C is a block diagram of an example computing system 90 which may also be used to implement one or more network apparatuses of a network, such as the entities illustrated in FIGS. 1-24 and described herein, which may operate as an M2M server, gateway, device, or other network apparatus in an M2M network such as that illustrated in FIGS. 25A and 25B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, in combination with the computer-executable instructions executed by CPU 91, may generate and operate the graphical user interface illustrated and described in FIG. 25D and its accompanying description.

Further, computing system 90 may contain communication circuitry, such as for example a network adaptor 97, that may be used to connect computing system 90 to an external communications network, such as network 12 of FIG. 25A-25D, to enable the computing system 90 to communicate with other apparatuses of the network. The communication circuitry, alone or in combination with the CPU 91, may be used to perform the transmitting and receiving steps described herein (e.g., in FIGS. 5, 6, 9-17 and 19-24) and in the claims.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

Table 12 shows a list of acronyms relating to service layer technologies that may appear in the above description. Unless otherwise specified, the acronyms used herein refer to the corresponding term listed below:

TABLE 12

| Acronyms | |
| --- | --- |
| ADN | Application Dedicated Network |
| AE | Application Entity |
| AF | Application Function |
| AMF | Access and Mobility Management Function |
| API | Application Programming Interface |
| ASN | Application Service Node |
| ASP | Application Service Provider |
| AUSF | Authentication Server Function |
| CM | Connection Management |
| CSE | Common Service Entity |
| CSF | Common Service Function |
| DAS | Data Anonymization Service |
| DN | Data Network |
| ETSI | European Telecommunications Standards Institute |
| IN | Infrastructure Network |
| IoT | Internet of Things |
| IP | Internet Protocol |
| LWM2M | Lightweight Machine to Machine |
| M2M | Machine to Machine |
| MN | Middle Node |
| NEF | Network Exposure Function |
| NF | Network Function |
| NWDA | Network Data Analytics |
| NoDN | Non-oneM2M Node |
| NAS | Non-Access Stratum |
| NRF | Network Repository Function |
| NSE | Network Service Entity |
| OCF | Open Connectivity Foundation |
| PCF | Policy Control Function |
| PDP | Policy Decision Point |
| PEP | Policy Enforcement Point |
| PPM | Privacy Policy Management |
| PPS | Privacy Policy Service |
| PRP | Policy Retrieval Point |
| (R)AN | (Radio) Access Network |
| RM | Registration Management |
| SL | Service Layer |
| SM | Session Management |
| SMF | Session Management Function |
| UDM | User Data Management |
| UDR | User Data Repository |
| UE | User Equipment |
| UPF | User Plane Function |
| 5GC | 3GPP 5G Core Network |

The following are descriptions and example definitions of terms used throughout the detailed description:

Part of a Data Set: a house address may be changed to only show the township name. The house number is not provided or is replaced with a dummy value.

Abbreviated Data Set: a person's name is changed to an acronym, initials, shortened form, etc.

Sanitized Data Set: data is removed from a data set and/or data is changed so that the important data is removed.

Substituted Data Set: persons' names can be substituted with a random number, generic name, alias, abbreviation, etc. Note that the terms related to "substitution" and "aliasing" are used interchangeably in this document.

Shuffled Data Set: similar to substitution but with data records among the data within a fixed domain (e.g., zip code) are randomly swapped among one another. Shuffled data set is a kind of modified data. For instance, average water consumption data among residents (households) of zip code 19128 can be shuffled and yet, it is possible to get some meaningful statistics such as median and mean for water consumption without violating user privacy.

Encrypted Data Set: a person's data can be encrypted with a key. Only application service providers with that key may be able to decrypt the data.

Data Subject: the entity that a piece of data pertains to. For example, the data subject of a medical record is a patient.

Users: natural persons or humans.

Network Function (NF): a processing function in a network which has defined functional behavior and defined interfaces. An NF can be implemented either as a network element on dedicated hardware, as a software instance running on dedicated hardware, or as a virtualized function instantiated on an appropriate platform (e.g., on a cloud infrastructure).

Examples of data anonymization and sanitization techniques include but are not limited to shuffling, filtering, masking, and aliasing. An example of filtering is removing data. An example of masking is removing part of a data set (e.g., 6789 3rd Ave. is masked to XXXX 3rd Ave.). An example of aliasing is reassigning names to entities (e.g., user Bob is changed to User-A, device door-lock is changed to device-1).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

The invention claimed is:

1. A method comprising:

receiving, by a service supporting service capabilities through a set of Application Programming Interfaces (APIs) and from an application service provider, a request to access data;

determining, by the service and based on the request to access the data, one or more privacy policies to be applied to the data for the application service provider, wherein the one or more privacy policies are generated by the service based on a subscriber privacy preference preconfigured by the service based on a request from a subscriber;

generating, by the service and based on the determined one or more privacy policies, an anonymized data set that prevents the application service provider from determining one or more user-identifying characteristics of the data; and sending, to the application service provider, the anonymized data set.

2. The method of claim 1, wherein the subscriber privacy preference is preconfigured by the service upon obtaining subscriber's consent to the service's privacy policy.

3. The method of claim 1, wherein generating the anonymized data set comprises one or more of removing at least a portion of the data or modifying at least a portion of the data.

4. The method of claim 3, wherein modifying at least a portion of the data comprises one or more of abbreviating at least a portion of the data, substituting at least a portion of the data, shuffling at least a portion of the data, or encrypting at least a portion of the data.

5. The method of claim 1, wherein the one or more privacy policies comprise one or more user policies associated with a particular user, one or more application service provider policies, or one or more legal policies.

6. The method of claim 1, wherein the request to access the data comprises one or more characteristics associated with the application service provider.

7. The method of claim 6, further comprising selecting, based at least on the one or more characteristics associated with the application service provider, one or more of a plurality of privacy policies.

8. The method of claim 1, wherein sending the anonymized data set comprises sending, to the application service provider, at least one of an indication that the data has been anonymized or an indication of the anonymization techniques used to anonymize the data.

9. An apparatus for a service of a communications network, wherein the service supports service capabilities through a set of Application Programming Interfaces (APIs), the apparatus comprising circuitry configured to:

receive, from an application service provider, a request to access data;

determine, based on the request to access the data, one or more privacy policies to be applied to the data for the application service provider, wherein the one or more privacy policies are generated by the service based on a subscriber privacy preference preconfigured by the service based on a request from a subscriber;

generate, based on the determined one or more privacy policies, an anonymized data set that prevents the application service provider from determining one or more user-identifying characteristics of the data; and send, to the application service provider, the anonymized data set.

10. The apparatus of claim 9, wherein the subscriber privacy preference is preconfigured by the service upon obtaining subscriber's consent to the service's privacy policy.

11. The apparatus of claim 10, wherein the circuitry is configured to generate the anonymized data set by one or more of removing at least a portion of the data or modifying at least a portion of the data.

12. The apparatus of claim 11, wherein the circuitry is configured to modify at least a portion of the data by one or more of abbreviating at least a portion of the data, substituting at least a portion of the data, shuffling at least a portion of the data, or encrypting at least a portion of the data.

13. The apparatus of claim 9, wherein the one or more privacy policies comprise one or more user policies associated with a particular user, one or more application service provider policies, or one or more legal policies.

14. The apparatus of claim 9, wherein the request to access the data comprises one or more characteristics associated with the application service provider.

15. The apparatus of claim 14, wherein the circuitry is further configured to perform operations comprising selecting, based at least on the one or more characteristics associated with the application service provider, one or more of a plurality of privacy policies.

16. The apparatus of claim 9, wherein the circuitry is configured to send the anonymized data set by sending, to the application service provider, at least one of an indication that the data has been anonymized or an indication of the anonymization techniques used to anonymize the data.

17. The method of claim 1, wherein the service is provided as a middleware service for IoT services.

18. The method of claim 17, wherein the middleware service is a service layer located on top of network protocol stacks.

19. The method of claim 18 wherein the service layer is defined according to ETSI/oneM2M standards.

* * * * *